US012088526B2

(12) United States Patent
Sakhnini et al.

(10) Patent No.: US 12,088,526 B2
(45) Date of Patent: *Sep. 10, 2024

(54) MULTI-PURPOSE SHARED TIME DOMAIN REFERENCE SIGNAL FOR HIGHER BANDS

(71) Applicant: QUALCOMM Incorporated, San Diego, CA (US)

(72) Inventors: Iyab Issam Sakhnini, San Diego, CA (US); Tao Luo, San Diego, CA (US); Xiaoxia Zhang, San Diego, CA (US); Jing Sun, San Diego, CA (US); Jun Ma, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,883

(22) Filed: May 19, 2023

(65) Prior Publication Data
US 2023/0299922 A1    Sep. 21, 2023

Related U.S. Application Data

(63) Continuation of application No. 17/245,175, filed on Apr. 30, 2021, now Pat. No. 11,689,332.

(51) Int. Cl.
*H04L 5/00*     (2006.01)
*H04W 72/044*   (2023.01)
*H04W 72/51*    (2023.01)

(52) U.S. Cl.
CPC ......... *H04L 5/0051* (2013.01); *H04W 72/044* (2013.01); *H04W 72/51* (2023.01)

(58) Field of Classification Search
CPC . H04L 5/0051; H04L 27/261; H04L 27/2636; H04L 5/0001; H04L 5/001;

(Continued)

(56) References Cited

U.S. PATENT DOCUMENTS 11,234,262 B2    1/2022   Manolakos et al.
2013/0322363 A1  12/2013  Chen et al.
(Continued)

FOREIGN PATENT DOCUMENTS

EP        3797496 A1 *  3/2021  ......... H04L 27/0008
WO    WO-2018005481 A1 *  1/2018  ............ H04L 12/28

OTHER PUBLICATIONS

International Search Report and Written Opinion—PCT/US2022/026672—ISA/EPO—Aug. 25, 2022.

*Primary Examiner* — Ian N Moore
*Assistant Examiner* — Latresa A McCallum

(57) ABSTRACT

Methods, systems, and devices for wireless communications are described. A user equipment (UE) may receive control signaling identifying a configuration for a reference signal comprising a single carrier waveform and associated with single carrier signals for a plurality of symbol periods, the configuration indicating a plurality of channels associated with the reference signal and a set of functions associated with the reference signal. The UE may receive, according to the configuration, the reference signal in a first one or more symbol periods of the plurality of symbol periods and the single carrier signals on the plurality of channels in a second one or more symbol periods of the plurality of symbol periods. The UE may perform the set of functions on the received single carrier signals based at least in part on the received reference signal.

26 Claims, 17 Drawing Sheets

(58) Field of Classification Search
CPC ... H04L 5/0048; H04L 5/0053; H04L 5/0094; H04L 5/22; H04W 72/51; H04W 72/044
See application file for complete search history.

(56) References Cited

U.S. PATENT DOCUMENTS

| | | |
|---|---|---|
| 2017/0272214 A1 | 9/2017 | Chen et al. |
| 2019/0222399 A1 | 7/2019 | Huang et al. |
| 2020/0229157 A1 | 7/2020 | Rastegardoost et al. |
| 2021/0021450 A1 | 1/2021 | Zhang et al. |
| 2022/0007428 A1* | 1/2022 | Lei ..................... H04L 5/0094 |
| 2022/0353037 A1 | 11/2022 | Sakhnini et al. |

* cited by examiner

MULTI-PURPOSE SHARED TIME DOMAIN REFERENCE SIGNAL FOR HIGHER BANDS

CROSS REFERENCE

The present application for patent is a continuation of U.S. patent application Ser. No. 17/245,175 by SAKHNINI et al., entitled "MULTI-PURPOSE SHARED TIME DOMAIN REFERENCE SIGNAL FOR HIGHER BANDS," filed Apr. 30, 2021, which is assigned to the assignee hereof and which is expressly incorporated by reference herein.

FIELD OF TECHNOLOGY

The following relates to wireless communications, including multi-purpose shared time domain reference signal for higher bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support multi-purpose shared time domain reference signal for higher bands. Generally, aspects of the described techniques reuse a time domain reference signal across different channels and/or for different purposes (e.g., CSI reporting and beam management). For example, a base station may provide (e.g., dynamically and/or semi-statically) a user equipment (UE) with a configuration for a time domain reference signal to be used for single carrier signals on multiple channels and/or functions associated with the reference signal. The time domain reference signal may use a single carrier waveform and may be used for uplink and/or downlink. The time domain reference signal may be transmitted (e.g., by the UE in the uplink scenario and/or by the base station in the downlink scenario) in some symbol period(s) and the single carrier signals across the different channels may be transmitted in the same and/or other symbol period(s). The UE and/or base station may use the single carrier time domain reference signal to perform multiple functions on the received single carrier signals. As one example, the time domain reference signal may be used as a demodulation reference signal (DMRS) for both physical downlink control channel (PDCCH) and physical downlink shared channel (PDSCH), and/or for both physical uplink control channel (PUCCH) and physical uplink shared channel (PUSCH). In another example, the time domain may be used for channel state information (CSI) reporting, beam management, tracking, etc. In some examples, the time domain reference signal may be used for DMRS purposes, sounding reference signal (SRS) purposes, CSI purposes, etc. (e.g., the same purposes or functions for which DMRS, SRS, CSI-RS are used). Accordingly, the more efficient time domain reference signal may be leveraged within the wireless communications system across multiple channels and functions.

A method for wireless communication at a UE is described. The method may include receiving control signaling identifying a configuration for a reference signal including a single carrier waveform and associated with single carrier signals for a set of multiple symbol periods, the configuration indicating a set of multiple channels associated with the reference signal and a set of functions associated with the reference signal, receiving, according to the configuration, the reference signal in a first one or more symbol periods of the set of multiple symbol periods and the single carrier signals on the set of multiple channels in a second one or more symbol periods of the set of multiple symbol periods, and performing the set of functions on the received single carrier signals based on the received reference signal.

An apparatus for wireless communication at a UE is described. The apparatus may include a processor, memory coupled with the processor, and instructions stored in the memory. The instructions may be executable by the processor to cause the apparatus to receive control signaling identifying a configuration for a reference signal including a single carrier waveform and associated with single carrier signals for a set of multiple symbol periods, the configuration indicating a set of multiple channels associated with the reference signal and a set of functions associated with the reference signal, receive, according to the configuration, the reference signal in a first one or more symbol periods of the set of multiple symbol periods and the single carrier signals on the set of multiple channels in a second one or more symbol periods of the set of multiple symbol periods, and perform the set of functions on the received single carrier signals based on the received reference signal.

Another apparatus for wireless communication at a UE is described. The apparatus may include means for receiving control signaling identifying a configuration for a reference signal including a single carrier waveform and associated with single carrier signals for a set of multiple symbol periods, the configuration indicating a set of multiple channels associated with the reference signal and a set of functions associated with the reference signal, means for receiving, according to the configuration, the reference signal in a first one or more symbol periods of the set of multiple symbol periods and the single carrier signals on the set of multiple channels in a second one or more symbol periods of the set of multiple symbol periods, and means for performing the set of functions on the received single carrier signals based on the received reference signal.

A non-transitory computer-readable medium storing code for wireless communication at a UE is described. The code may include instructions executable by a processor to receive control signaling identifying a configuration for a reference signal including a single carrier waveform and associated with single carrier signals for a set of multiple symbol periods, the configuration indicating a set of multiple channels associated with the reference signal and a set of functions associated with the reference signal, receive, according to the configuration, the reference signal in a first one or more symbol periods of the set of multiple symbol periods and the single carrier signals on the set of multiple channels in a second one or more symbol periods of the set of multiple symbol periods, and perform the set of functions on the received single carrier signals based on the received reference signal.

Some examples of the method, apparatuses, and non-transitory computer-readable medium described herein may further include operations, features, means, or instructions for identifying the set of multiple channels based on one or more channel indicators in the control signaling.

Some examples of the method, apparatuses, and non-transitory computer-readable medium described herein may further include operations, features, means, or instructions for identifying the set of multiple symbol periods based on one or more time window indicators in the control signaling.

Some examples of the method, apparatuses, and non-transitory computer-readable medium described herein may further include operations, features, means, or instructions for identifying the set of multiple channels based on the set of multiple symbol periods.

Some examples of the method, apparatuses, and non-transitory computer-readable medium described herein may further include operations, features, means, or instructions for determining a set of channels that may be within the set of multiple symbol periods identified from the one or more time window indicators, where the set of multiple channels indicated by the configuration include the determined set of channels.

Some examples of the method, apparatuses, and non-transitory computer-readable medium described herein may further include operations, features, means, or instructions for identifying one or more ports from a set of multiple ports based on the configuration, the one or more ports for performing the set of functions on the received single carrier signals based on the received reference signal.

Some examples of the method, apparatuses, and non-transitory computer-readable medium described herein may further include operations, features, means, or instructions for transmitting a UE capability message to a base station identifying that the UE supports performing the set of functions based on the received reference signal including the single carrier waveform and associated with the single carrier signals for the set of multiple symbol periods and the set of multiple channels, where the configuration may be based on the UE capability message.

Some examples of the method, apparatuses, and non-transitory computer-readable medium described herein may further include operations, features, means, or instructions for receiving the control signal identifying the configuration in a semi-static configuration signal, a dynamic configuration signal, or both.

Some examples of the method, apparatuses, and non-transitory computer-readable medium described herein may further include operations, features, means, or instructions for receiving the control signal identifying the configuration in a UE-specific configuration signal.

Some examples of the method, apparatuses, and non-transitory computer-readable medium described herein may further include operations, features, means, or instructions for receiving the control signal identifying the configuration in a multi-UE configuration signal.

A method for wireless communication at a UE is described. The method may include receiving control signaling identifying a configuration for a reference signal including a single carrier waveform and associated with single carrier signals for a set of multiple symbol periods, the configuration indicating a set of multiple channels associated with the reference signal and a set of functions associated with the reference signal, transmitting, according to the configuration, the reference signal in a first one or more symbol periods of the set of multiple symbol periods, and transmitting the single carrier signals in a second one or more symbol periods of the set of multiple symbol periods, where the set of functions are to be performed on the transmitted single carrier signals based on the transmitted reference signal.

An apparatus for wireless communication at a UE is described. The apparatus may include a processor, memory coupled with the processor, and instructions stored in the memory. The instructions may be executable by the processor to cause the apparatus to receive control signaling identifying a configuration for a reference signal including a single carrier waveform and associated with single carrier signals for a set of multiple symbol periods, the configuration indicating a set of multiple channels associated with the reference signal and a set of functions associated with the reference signal, transmit, according to the configuration, the reference signal in a first one or more symbol periods of the set of multiple symbol periods, and transmit the single carrier signals in a second one or more symbol periods of the set of multiple symbol periods, where the set of functions are to be performed on the transmitted single carrier signals based on the transmitted reference signal.

Another apparatus for wireless communication at a UE is described. The apparatus may include means for receiving control signaling identifying a configuration for a reference signal including a single carrier waveform and associated with single carrier signals for a set of multiple symbol periods, the configuration indicating a set of multiple channels associated with the reference signal and a set of functions associated with the reference signal, means for transmitting, according to the configuration, the reference signal in a first one or more symbol periods of the set of multiple symbol periods, and means for transmitting the single carrier signals in a second one or more symbol periods of the set of multiple symbol periods, where the set of functions are to be performed on the transmitted single carrier signals based on the transmitted reference signal.

A non-transitory computer-readable medium storing code for wireless communication at a UE is described. The code may include instructions executable by a processor to receive control signaling identifying a configuration for a reference signal including a single carrier waveform and associated with single carrier signals for a set of multiple symbol periods, the configuration indicating a set of multiple channels associated with the reference signal and a set of functions associated with the reference signal, transmit, according to the configuration, the reference signal in a first one or more symbol periods of the set of multiple symbol periods, and transmit the single carrier signals in a second one or more symbol periods of the set of multiple symbol periods, where the set of functions are to be performed on the transmitted single carrier signals based on the transmitted reference signal.

Some examples of the method, apparatuses, and non-transitory computer-readable medium described herein may further include operations, features, means, or instructions for identifying the set of multiple channels based on one or more channel indicators in the control signaling.

Some examples of the method, apparatuses, and non-transitory computer-readable medium described herein may further include operations, features, means, or instructions for identifying the set of multiple symbol periods based on one or more time window indicators in the control signaling.

Some examples of the method, apparatuses, and non-transitory computer-readable medium described herein may further include operations, features, means, or instructions for identifying the set of multiple channels based on the set of multiple symbol periods.

Some examples of the method, apparatuses, and non-transitory computer-readable medium described herein may further include operations, features, means, or instructions for determining a set of channels that may be within the set of multiple symbol periods identified from the one or more time window indicators, where the set of multiple channels indicated by the configuration include the determined set of channels.

Some examples of the method, apparatuses, and non-transitory computer-readable medium described herein may further include operations, features, means, or instructions for identifying one or more ports from a set of multiple ports based on the configuration, the one or more ports for performing the set of functions on the received single carrier signals based on the received reference signal.

Some examples of the method, apparatuses, and non-transitory computer-readable medium described herein may further include operations, features, means, or instructions for transmitting a UE capability message to a base station identifying that the UE supports performing the set of functions based on the received reference signal including the single carrier waveform and associated with the single carrier signals for the set of multiple symbol periods and the set of multiple channels, where the configuration may be based on the UE capability message.

Some examples of the method, apparatuses, and non-transitory computer-readable medium described herein may further include operations, features, means, or instructions for receiving the control signal identifying the configuration in a semi-static configuration signal, a dynamic configuration signal, or both.

Some examples of the method, apparatuses, and non-transitory computer-readable medium described herein may further include operations, features, means, or instructions for receiving the control signal identifying the configuration in a UE-specific configuration signal.

Some examples of the method, apparatuses, and non-transitory computer-readable medium described herein may further include operations, features, means, or instructions for receiving the control signal identifying the configuration in a multi-UE configuration signal.

A method for wireless communication at a base station is described. The method may include transmitting control signaling identifying a configuration for a reference signal including a single carrier waveform and associated with single carrier signals for a set of multiple symbol periods, the configuration indicating a set of multiple channels associated with the reference signal and a set of functions associated with the reference signal, transmitting, according to the configuration, the reference signal in a first one or more symbol periods of the set of multiple symbol periods, and transmitting the single carrier signals on the set of multiple channels in a second one or more symbol periods of the set of multiple symbol periods, where the set of functions are to be performed on the transmitted single carrier signals based on the transmitted reference signal.

An apparatus for wireless communication at a base station is described. The apparatus may include a processor, memory coupled with the processor, and instructions stored in the memory. The instructions may be executable by the processor to cause the apparatus to transmit control signaling identifying a configuration for a reference signal including a single carrier waveform and associated with single carrier signals for a set of multiple symbol periods, the configuration indicating a set of multiple channels associated with the reference signal and a set of functions associated with the reference signal, transmit, according to the configuration, the reference signal in a first one or more symbol periods of the set of multiple symbol periods, and transmit the single carrier signals on the set of multiple channels in a second one or more symbol periods of the set of multiple symbol periods, where the set of functions are to be performed on the transmitted single carrier signals based on the transmitted reference signal.

Another apparatus for wireless communication at a base station is described. The apparatus may include means for transmitting control signaling identifying a configuration for a reference signal including a single carrier waveform and associated with single carrier signals for a set of multiple symbol periods, the configuration indicating a set of multiple channels associated with the reference signal and a set of functions associated with the reference signal, means for transmitting, according to the configuration, the reference signal in a first one or more symbol periods of the set of multiple symbol periods, and means for transmitting the single carrier signals on the set of multiple channels in a second one or more symbol periods of the set of multiple symbol periods, where the set of functions are to be performed on the transmitted single carrier signals based on the transmitted reference signal.

A non-transitory computer-readable medium storing code for wireless communication at a base station is described. The code may include instructions executable by a processor to transmit control signaling identifying a configuration for a reference signal including a single carrier waveform and associated with single carrier signals for a set of multiple symbol periods, the configuration indicating a set of multiple channels associated with the reference signal and a set of functions associated with the reference signal, transmit, according to the configuration, the reference signal in a first one or more symbol periods of the set of multiple symbol periods, and transmit the single carrier signals on the set of multiple channels in a second one or more symbol periods of the set of multiple symbol periods, where the set of functions are to be performed on the transmitted single carrier signals based on the transmitted reference signal.

Some examples of the method, apparatuses, and non-transitory computer-readable medium described herein may further include operations, features, means, or instructions for receiving a UE capability message identifying that a UE supports performing the set of functions based on the transmitted reference signal including the single carrier waveform and associated with the single carrier signals for the set of multiple symbol periods and the set of multiple channels, where the configuration may be based on the UE capability message.

Some examples of the method, apparatuses, and non-transitory computer-readable medium described herein may further include operations, features, means, or instructions for transmitting the control signal identifying the configuration in a semi-static configuration signal, a dynamic configuration signal, or both.

Some examples of the method, apparatuses, and non-transitory computer-readable medium described herein may further include operations, features, means, or instructions for transmitting the control signal identifying the configuration in a UE-specific configuration signal.

Some examples of the method, apparatuses, and non-transitory computer-readable medium described herein may further include operations, features, means, or instructions for transmitting the control signal identifying the configuration in a multi-UE configuration signal.

A method for wireless communication at a base station is described. The method may include transmitting control signaling identifying a configuration for a reference signal including a single carrier waveform and associated with single carrier signals for a set of multiple symbol periods, the configuration identifying a set of multiple channels associated with the reference signal and a set of functions associated with the reference signal, receiving, according to the configuration, the reference signal in a first one or more symbol periods of the set of multiple symbol periods and receiving the single carrier signals in a second one or more symbol periods of the set of multiple symbol periods, and performing the set of functions on the received single carrier signals based on the transmitted reference signal.

An apparatus for wireless communication at a base station is described. The apparatus may include a processor, memory coupled with the processor, and instructions stored in the memory. The instructions may be executable by the processor to cause the apparatus to transmit control signaling identifying a configuration for a reference signal including a single carrier waveform and associated with single carrier signals for a set of multiple symbol periods, the configuration identifying a set of multiple channels associated with the reference signal and a set of functions associated with the reference signal, receive, according to the configuration, the reference signal in a first one or more symbol periods of the set of multiple symbol periods and receiving the single carrier signals in a second one or more symbol periods of the set of multiple symbol periods, and perform the set of functions on the received single carrier signals based on the transmitted reference signal.

Another apparatus for wireless communication at a base station is described. The apparatus may include means for transmitting control signaling identifying a configuration for a reference signal including a single carrier waveform and associated with single carrier signals for a set of multiple symbol periods, the configuration identifying a set of multiple channels associated with the reference signal and a set of functions associated with the reference signal, means for receiving, according to the configuration, the reference signal in a first one or more symbol periods of the set of multiple symbol periods and receiving the single carrier signals in a second one or more symbol periods of the set of multiple symbol periods, and means for performing the set of functions on the received single carrier signals based on the transmitted reference signal.

A non-transitory computer-readable medium storing code for wireless communication at a base station is described. The code may include instructions executable by a processor to transmit control signaling identifying a configuration for a reference signal including a single carrier waveform and associated with single carrier signals for a set of multiple symbol periods, the configuration identifying a set of multiple channels associated with the reference signal and a set of functions associated with the reference signal, receive, according to the configuration, the reference signal in a first one or more symbol periods of the set of multiple symbol periods and receiving the single carrier signals in a second one or more symbol periods of the set of multiple symbol periods, and perform the set of functions on the received single carrier signals based on the transmitted reference signal.

Some examples of the method, apparatuses, and non-transitory computer-readable medium described herein may further include operations, features, means, or instructions for receiving a UE capability message identifying that a UE supports performing the set of functions based on the transmitted reference signal including the single carrier waveform and associated with the single carrier signals for the set of multiple symbol periods and the set of multiple channels, where the configuration may be based on the UE capability message.

Some examples of the method, apparatuses, and non-transitory computer-readable medium described herein may further include operations, features, means, or instructions for transmitting the control signal identifying the configuration in a semi-static configuration signal, a dynamic configuration signal, or both.

Some examples of the method, apparatuses, and non-transitory computer-readable medium described herein may further include operations, features, means, or instructions for transmitting the control signal identifying the configuration in a UE-specific configuration signal.

Some examples of the method, apparatuses, and non-transitory computer-readable medium described herein may further include operations, features, means, or instructions for transmitting the control signal identifying the configuration in a multi-UE configuration signal.

DETAILED DESCRIPTION

Figure 1:
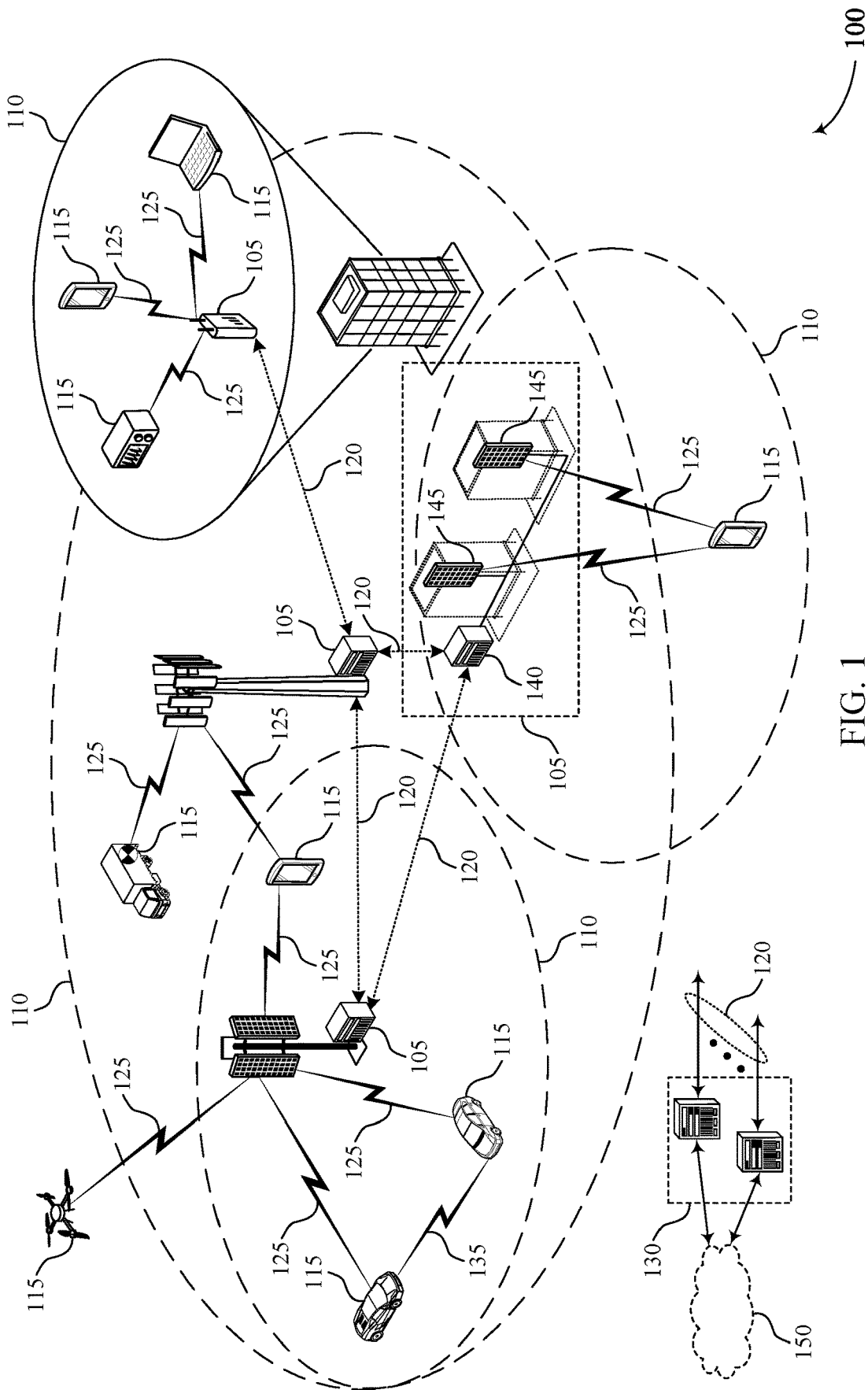
FIG. 1 illustrates an example of a wireless communications system that supports multi-purpose shared time domain reference signal for higher bands in accordance with aspects of the present disclosure.

Some wireless communications systems may operate in high operating radio frequency spectrum bands (e.g., 100+ GHz) to provide higher bandwidths. These wireless communications systems may also operate using a single carrier waveform. Typically, different channels using a single carrier waveform (e.g., physical downlink control channel (PDCCH), physical downlink shared channel (PDSCH), demodulation reference signal (DMRS), sounding reference signal (SRS), physical uplink control channel (PUCCH), physical uplink shared channel (PUSCH), etc.) are time-domain multiplexed and may share the same bandwidth. That is, such channels may share the same bandwidth, but be multiplexed in the time domain (e.g., the DMRS for PDCCH and PDSCH may share the same bandwidth, but use different symbol periods). Accordingly, in some cases it may be more efficient for different channels and functions (channel estimation, beam management, etc.) to share the same reference signal, provided that certain conditions are satisfied.

Generally, aspects of the described techniques reuse a time domain reference signal across different channels and/or for different purposes (e.g., CSI reporting and beam management). For example, a base station may provide (e.g., dynamically and/or semi-statically) a user equipment (UE) with a configuration for a time domain reference signal to be used for single carrier signals on multiple channels and/or functions associated with the reference signal. The time domain reference signal may use a single carrier waveform and may be used for uplink and/or downlink. The time domain reference signal may be transmitted (e.g., by the UE in the uplink scenario and/or by the base station in the downlink scenario) in some symbol period(s) and the single carrier signals across the different channels may be transmitted in the same and/or other symbol period(s). The UE and/or base station may use the single carrier time domain reference signal to perform multiple functions on the received single carrier signals. As one example, the time domain reference signal may be used as a demodulation reference signal (DMRS) for both physical downlink control channel (PDCCH) and physical downlink shared channel (PDSCH), and/or for both physical uplink control channel (PUCCH) and physical uplink shared channel (PUSCH). In another example, the time domain may be used for channel state information (CSI) reporting, beam management, tracking, etc. In some examples, the time domain reference signal may be used for DMRS purposes, sounding reference signal (SRS) purposes, CSI purposes, etc. Accordingly, the more efficient time domain reference signal may be leveraged within the wireless communications system across multiple channels and functions.

Aspects of the disclosure are initially described in the context of wireless communications systems. Aspects of the disclosure are further illustrated by and described with reference to apparatus diagrams, system diagrams, and flowcharts that relate to multi-purpose shared time domain reference signal for higher bands.

FIG. 1 illustrates an example of a wireless communications system 100 that supports multi-purpose shared time domain reference signal for higher bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may receive control signaling identifying a configuration for a reference signal comprising a single carrier waveform and associated with single carrier signals for a plurality of symbol periods, the configuration indicating a plurality of channels associated with the reference signal and a set of functions associated with the reference signal. The UE 115 may receive, according to the configuration, the reference signal in a first one or more symbol periods of the plurality of symbol periods and the single carrier signals on the plurality of channels in a second one or more symbol periods of the plurality of symbol periods. The UE 115 may perform the set of functions on the received single carrier signals based at least in part on the received reference signal.

A UE 115 may receive control signaling identifying a configuration for a reference signal comprising a single carrier waveform and associated with single carrier signals for a plurality of symbol periods, the configuration indicating a plurality of channels associated with the reference signal and a set of functions associated with the reference signal. The UE 115 may transmit, according to the configuration, the reference signal in a first one or more symbol periods of the plurality of symbol periods. The UE 115 may transmit the single carrier signals in a second one or more symbol periods of the plurality of symbol periods, wherein the set of functions are to be performed on the transmitted single carrier signals based at least in part on the transmitted reference signal.

A base station 105 may transmit control signaling identifying a configuration for a reference signal comprising a single carrier waveform and associated with single carrier signals for a plurality of symbol periods, the configuration indicating a plurality of channels associated with the reference signal and a set of functions associated with the reference signal. The base station 105 may transmit, according to the configuration, the reference signal in a first one or more symbol periods of the plurality of symbol periods. The base station 105 may transmit the single carrier signals on the plurality of channels in a second one or more symbol periods of the plurality of symbol periods, wherein the set of functions are to be performed on the transmitted single carrier signals based at least in part on the transmitted reference signal.

A base station 105 may transmit control signaling identifying a configuration for a reference signal comprising a single carrier waveform and associated with single carrier signals for a plurality of symbol periods, the configuration identifying a plurality of channels associated with the reference signal and a set of functions associated with the reference signal. The base station 105 may receive, according to the configuration, the reference signal in a first one or more symbol periods of the plurality of symbol periods and receiving the single carrier signals in a second one or more symbol periods of the plurality of symbol periods. The base station 105 may perform the set of functions on the received single carrier signals based at least in part on the transmitted reference signal.

Figure 2:
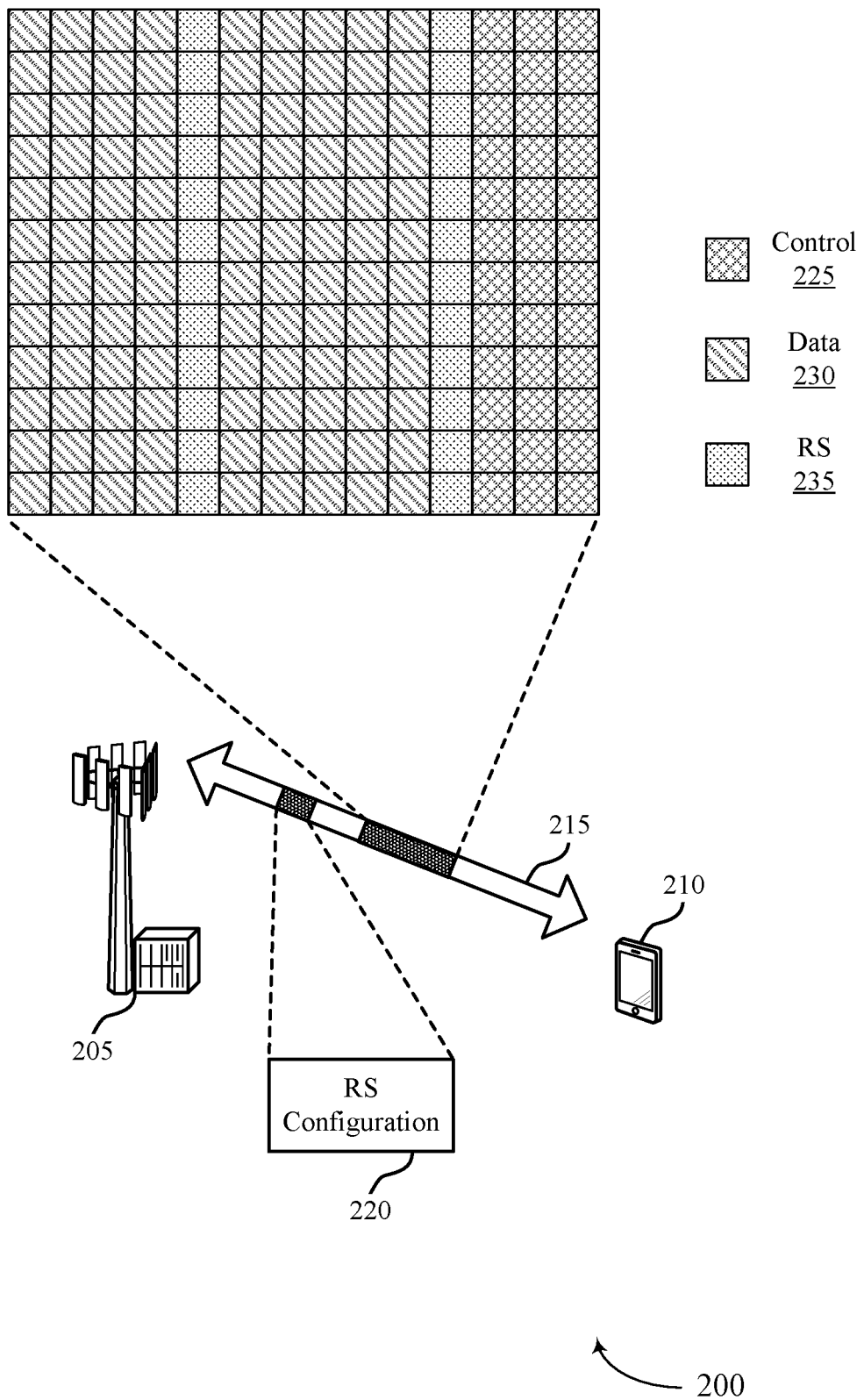
FIG. 2 illustrates an example of a wireless communications system that supports multi-purpose shared time domain reference signal for higher bands in accordance with aspects of the present disclosure.

FIG. 2 illustrates an example of a wireless communications system 200 that supports multi-purpose shared time domain reference signal for higher bands in accordance with aspects of the present disclosure. Wireless communications system 200 may implement aspects of wireless communications system 100. Aspects of wireless communications system 200 may include base station 205 and UE 210, which may be examples of the corresponding devices described herein.

Wireless communications systems rely on a waveform as the radio link in the RAN for uplink communications from UE 210 to base station 205 and for downlink communications from base station 205 to UE 210. A variety of different waveforms and modulation techniques may be used for communication link 215 between a base station 205 and UE 210. Traditionally, different waveforms have been used for uplink communications and downlink communications. For example, downlink communications typically rely on an OFDM waveform structure whereas uplink communications typically rely on a single carrier (SC) waveform structure.

The OFDM waveform structure is a frequency division multiplexing scheme were multiple orthogonal subcarriers are used to transmit the data in parallel (e.g., at the same time). That is, each bit stream is typically assigned to a subcarrier (or subgroup of subcarriers within the bandwidth) and transmitted over the RAN. Different subcarriers carrying different data streams typically provide high PAPR, spectral efficiency, is resilient to selective fading, and the like. OFDM may enable higher order MIMO communications resulting in increased data rates. OFDM provides an easy FDM capability with improved spectral efficiency, with efficient bandwidth utilization as no guard band is needed. OFDM may enable higher order MIMO techniques to be employed in order to achieve extremely high data rates. OFDM may utilized single-tap frequency domain equalization. One variant of OFDM used for downlink communications includes OFDMA, where the data stream-per subcarrier can further be divided in the time domain for increased access flexibility (e.g., the allocation-per-user is configured both in the time and frequency domain). Another advantage of OFDM is that the OFDM waveform structure can be easily processed (e.g., using FFT) by UEs, such as UE 210. Such OFDM based waveform structures are sometimes referred to as multi-carrier waveforms and may support multiple orthogonal subcarriers within a given carrier bandwidth.

In contrast, the SC waveform structure (e.g., SC-OFDM) typically used for uplink communications relies on a different waveform structure. In particular, an SC waveform structure uses the allocated bandwidth in a time domain, multiple subcarrier fashion. That is, during a first symbol period all of the allocated subcarriers are used to transmit the same bit stream over the uplink channel (which reduces PAPR). During the next symbol period, all of the allocated subcarriers are again used to carry the same bit stream (which may be the same or different from the bit stream transmitted in the first symbol period) over the uplink channel. Such time domain symbol sequencing is typically associated with a lower PAPR, which increases power amplifier efficiency and extends the battery life of the UE. SC waveform structures are generally less sensitive to frequency offset compared to OFDM waveform structures.

Accordingly, conventional wireless communications systems have relied on different waveform structures for uplink and downlink communications. However, advanced wireless communications systems (such as wireless communications system 200) may operate in higher radio frequency bands (e.g., 100+ GHz) in order to provide even larger bandwidths. Moreover, the processing power/capability of UEs continues to improve such that the processing load of the UE is less of a concern, although still present. Accordingly, different waveform structures are being considered for use in downlink communications. One example being considered as an SC frequency domain implementation (e.g., discrete Fourier transform spread OFDM (DFT-s-OFDM)). This waveform structure is typically associated with a lower PAPR (e.g., better coverage), may use a single tap frequency domain equalization, and provide efficient bandwidth utilization is no guard band is needed.

Another example being considered is the SC time domain implementation (e.g., SC-QAM). This waveform structure is also associated with a lower PAPR and improved coverage, but may also provide lower complexity in its limitation (e.g., no FFT/IFFT are needed). Some examples of the SC-QAM waveform structure may also use a cyclic prefix to add frequency domain equalization support (e.g., SC-FDE).

In such scenarios (e.g., SC waveforms being used in the downlink), different channels/signals (e.g., PDCCH, PDSCH, DMRS, SRS, etc.) may be multiplexed in the time domain. That is, unlike CP-OFDM, the channels/signals carried in a SC waveform structure may share the same bandwidth and only differ in the time domain allocation (e.g., DMRS for a PDSCH and PDCCH may use the same bandwidth). Accordingly, this may result in an opportunity to reduce overhead by enabling some channels/functions to share the same reference signal provided that some conditions are satisfied. Additionally, such shared time domain reference signal may also be reused for different purposes/functions (e.g., SRS may be used for channel estimation, beam management, etc.). Accordingly, aspects of the described techniques provide various mechanisms for reusing a time domain reference signal across different channels and/or for different purposes.

For example, aspects of the described techniques provide for the same time domain reference signal to be configured such that the reference signal is shared by one or more channels and/or shared by one or more instances of a certain channel and/or can be reused for multiple uses/functions. As non-limiting examples, this may include the same DMRS being reused by PDCCH/PDSCH, an CSI-RS being used for beam management as well as channel estimation for PDCCH, an SRS being reused for PUSCH channel estimation as well as beam management, and the like.

Accordingly, aspects of the described techniques may include base station 205 transmitting, providing, or otherwise conveying control signaling 220 to UE 210. Broadly, the control signaling 220 may indicate or otherwise identify a configuration for a reference signal (e.g., the time domain reference signal, which is identified as reference signal (RS) 235 in FIG. 2). The reference signal 235 may be a single carrier reference signal used for, or otherwise associated with single carrier signals for a plurality of symbol periods. In some aspects, the configuration may indicate or otherwise identify the plurality of channels and/or the set of functions that are to use or are otherwise associated with the reference signal.

In some aspects, the control signaling 220 identifying/indicating the configuration may be dynamically and/or semi-statically provided by base station 205. For example, the control signaling may use RRC signaling, MAC CE signaling, DCI signaling, and/or other signaling techniques. Base station 205 may initially provide the configuration to UE 210 during initial connection and/or update the configuration to UE 210 as-needed and/or according to a periodic update schedule. In some aspects, the configuration may be based on the capability of UE 210. For example, UE 210 may transmit, provide, or otherwise convey a UE capability message to base station 205 indicating that it supports reference signal 235 comprising the single carrier reference signal shared across multiple channels/functions. The UE capability message may generally indicate or otherwise identify that UE 210 supports using the shared single carrier reference signal (e.g., reference signal 235) across multiple channels and/or functions across different symbol periods. Base station 205 may provide the configuration for reference signal 235 based on the capability of UE 210 (e.g., based on the UE capability message). In some aspects, the configuration for reference signal 235 may be provided on a per-UE basis (e.g., the control signaling 220 may identify the configuration in a UE-specific configuration signal) and/or on a multi-UE basis (e.g., the control signaling 220 may identify the configuration in a multi-UE configuration signal).

In some aspects, the configuration of reference signal 235 may be based on a coherence time of reference signal 235. That is, reference signal 235 may be a single carrier reference signal transmitted during a first symbol period (e.g., one or more symbols within slot(s)). As such, the reference signal may provide a viable indication of the RAN (e.g., the channel performance) for a given time period (e.g., coherence window). That is, the single carrier reference signal transmitted across the full bandwidth during the first symbol period may provide a valuable indication of the channel performance during the first symbol. However, channel conditions change such that the channel performance changes over time. In some situations, the rate of change of the channel conditions and/or the duration of the symbol periods may be such that the channel performance indicated by the single carrier reference signal during the first symbol period may be value for additional pre- and/or post-symbol periods (e.g., during a coherence/time window). Accordingly, the single carrier reference signal (e.g., reference signal 235) may provide a valid indicator of the channel performance for the time window.

Accordingly, the single carrier reference signal may be communicated during the first symbol period and then other single carrier signals on multiple channels in a second one or more symbol periods. The single carrier reference signal may be used to perform the set of functions on the single carrier signals communicated across a set/plurality of channels (such as control channels 225 and/or data channels 230). It is to be understood that the set/plurality of channels associated with the reference signal 235 may include any combination of uplink channels and/or downlink channels. Examples of downlink channels include, but are not limited to, PDCCH, PDSCH, PFSCH, PBCH, and the like. Examples of the uplink channels include, but are not limited to, PUCCH, PUSCH, PRACH, and the like.

In some aspects, the set/plurality of symbol periods associated with the reference signal 235 may indicated or otherwise identified by the control signaling 220. For example, UE 210 may identify or otherwise determine the set/plurality of symbol periods based on time window indicator(s) in the control signaling 220. The time window indicator(s) identified in the control signaling 220 may be based on the coherence time of the reference signal 235. For example, base station 205 and/or UE 210 may identify or otherwise determine the rate of change of the channel performance. In some examples, base station 205 may provide the time window indicator(s) in the control signaling 220 based on the coherence time associated with reference signal 235 during each allocated symbol period (e.g., on a per-symbol period basis). In some examples, base station 205 may provide the time window indicator(s) in the control signaling 220 based on the coherence time associated with reference signal 235 during the plurality of symbol periods (e.g., the time window indicator(s) may identify the plurality of symbol periods).

In some aspects, the channels that may use the reference signal 235 may be indicated or otherwise identified by the control signaling 220. For example, UE 210 may identify the set/plurality of channels associated with the reference signal 235 based at least in part on the control signaling 220. In one example, the control signaling 220 may explicitly indicate the plurality of channels associated with the reference signal 235 (e.g., may explicitly indicate that UE 210 is to use the reference signal 235 for a PDCCH and the corresponding PDSCH). In another example, the control signaling 220 may implicitly indicate the plurality of channels associated with the reference signal 235 (e.g., may be windows based). For example, any channel that falls within a preconfigured window may use the reference signal 235 for channel estimation. In some aspects, the preconfigured window may be based at least in part on the coherence time of the reference signal 235 (e.g., based on the rate of change of the channel performance for the bandwidth). Accordingly, in this example the time window indicator(s) provided in the control signaling 220 may implicitly indicate the channels associated with the reference signal 235. Accordingly, in this situation, UE 210 may identify or otherwise determine the set of channels within the plurality of symbol periods based on the time window indicator(s).

In some aspects, the control signaling 220 (e.g., the configuration) may indicate or otherwise identify one or more ports to use for performing the set of functions on the single carrier signals based on the reference signal 235. For example, if a channel has more than one port (e.g., a rank 2 PDSCH), base station 205 may indicate in the control signaling 220 which port(s) may reuse the reference signal 235 for channel estimation. In another example, if the reference signal 235 has more than one port, base station 205 may indicate in the control signaling 220 which port(s) may be used for the channel estimation, beam management, etc.

Accordingly, base station 205 and/or UE 210 may communicate the reference signal 235 during the first symbol period(s) and then communicate the single carrier signals (e.g., control channels 225 and/or data channels 230) during second symbol period(s). Base station 205 and/or UE 210 may then perform the set of functions on the received single carrier signals based on the received reference signal (e.g., reference signal 235).

As discussed above, the single carrier reference signal may be used for downlink and/or uplink communications. That is, the reference signal 235 may be configured for UE 210 to use for uplink communications and/or for downlink communications. In the downlink communication example, that may include base station 205 transmitting the reference signal 235 in the first symbol period(s) and the single carrier signals on the plurality of channels in second symbol period(s). UE 210, in this downlink example, may receive the transmissions from base station 205 and then perform the set of functions on the received single carrier signals based on the received reference signal. In the uplink communication example, that may include UE 210 transmitting the reference signal 235 in the first symbol period(s) and the single carrier signals on the plurality of channels in second symbol period(s). Base station 205, in this uplink example, may receive the transmissions from UE 210 and then perform the set of functions on the received single carrier signals based on the received reference signal.

The set of functions may include various functions previously performed using separate reference signals. For example, the reference signal 235 indicated in the control signaling 220 may be used for channel estimation functions, beam management functions, tracking/positioning functions, and the like. Examples of other functions that may be performed using reference signal 235 may include decoding functions (e.g., such as functions performed using DMRS) for the single carrier signals. Depending on the set of functions being performed using the reference signal 235, certain rules may be satisfied to support reusing the reference signal 235.

For example, if the reference signal 235 is used for channel estimation, certain rules may be considered/satisfied. One rule may be that the bandwidth of the reference signal 235 should be the same or more than that of the channel(s) that utilizes this reference signal 235. That is, if the bandwidths are the same, there is no issue with reusing the reference signal 235 for channel estimation. If the reference signal 235 bandwidth is wider than the channel, then the channel estimate may be estimated from the part that overlaps with the channel(s) in the frequency domain.

Another rule may be to ensure phase continuity, the UE 210 radio frequency configuration should not change between the reference signal 235 and the channel(s) (e.g., no radio frequency bandwidth switching or frequency change is allowed). That is, if the reference signal 235 and channel are in different frequency locations, the UE 210 radio frequency bandwidth should be wide enough to cover both reference signals 235.

Another rule may be that the time between the reference signal 235 and the channel(s) should be less than a certain time (e.g., the coherence time). Another rule may be that, if DFT-s-OFDM is used, the same numerology (SCS) must be used for both the reference signal 235 and the channel(s). Yet another rule may be that, for uplink communications and to ensure phase continuity, the power ratio between the reference signal 235 and the channel(s) needs to be 0.

Figure 3:
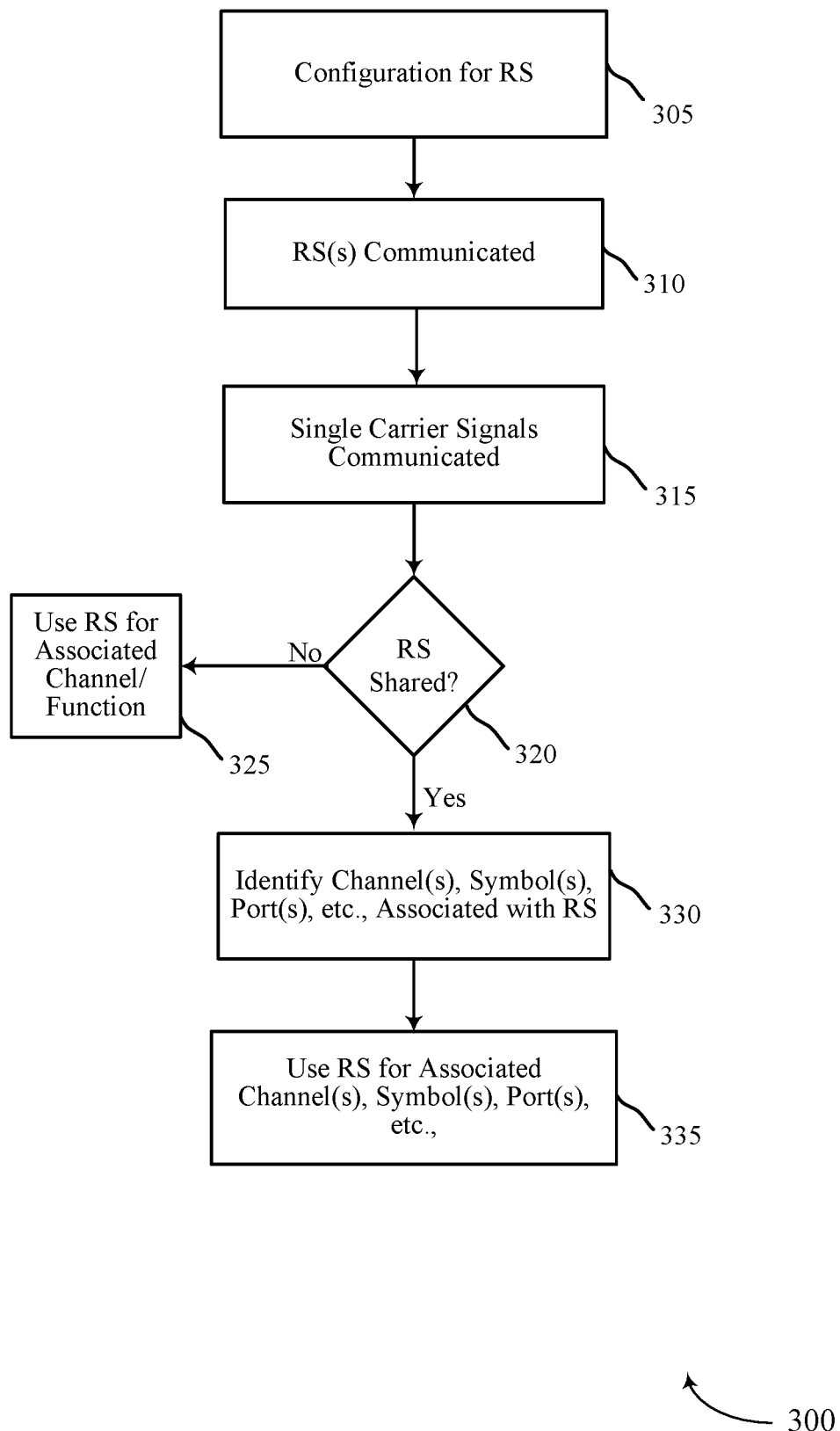
FIG. 3 illustrates an example of a method that supports multi-purpose shared time domain reference signal for higher bands in accordance with aspects of the present disclosure.

FIG. 3 illustrates an example of a method 300 that supports multi-purpose shared time domain reference signal for higher bands in accordance with aspects of the present disclosure. Method 300 may implement aspects of wireless communications systems 100 and/or 200. Aspects of method 300 may be implemented by a base station and/or UE, which may be examples of the corresponding devices described herein.

At 305, the configuration for a reference signal (e.g., a single carrier waveform reference signal) associated with single carrier signals over a plurality of symbol periods may be identified or otherwise determine. For example, base station may identify or otherwise determine the configuration for the reference signal and transmit or otherwise provide an indication of the configuration to a UE using control signaling (e.g., dynamic and/or semi-static control signaling). In some aspects, the configuration may indicate or otherwise identify a plurality of channels and a set of functions associated with the reference signal. The set of channels may include any uplink channel and/or downlink channel. The set of functions may include any function typically performed via a wireless communications that is at least in some part associated with a reference signal (which would traditionally require separate reference signals to be configured and transmitted for each function).

At 310, the single carrier waveform reference signal may be transmitted during a first symbol period of the plurality of symbol periods. For example, in the downlink scenario the base station may transmit the reference signal according to the configuration during the first symbol period(s). In the uplink scenario, the UE may transmit the reference signal according to the configuration during the first symbol period(s). In some aspects, the reference signal may be transmitted across the allocated bandwidth of the UE.

At 315, the single carrier signals may be transmitted on the plurality of channels in second symbol period(s). The single carrier signals may include control signals and/or data signals. In the downlink scenario, this may include the base station transmitting the single carrier signals to the UE across a plurality of channels (e.g., single carrier PDCCH, PDSCH, PBCH, and any other downlink channel(s)). In the uplink scenario, this may include the UE transmitting the single carrier signals to the base station across the plurality of channels (e.g., single carrier PUCCH, PUSCH, PRACH, and any other uplink channel(s)).

At 320, the configuration may be used to determine whether or not the reference signal is a single carrier reference signal shared across a plurality of channels for a plurality of symbol periods. For example, the UE and/or base station may use the configuration and determine whether that reference signal transmitted at 310 can be shared for the plurality of channels and/or the set of functions. If not, at 325 the base station and/or UE may use the reference signal for the associated channel and/or function. That is, if the reference signal is not a single carrier waveform reference signal communicated during the first symbol period, then the reference signal may be used for its designated/configured purpose (e.g., DMRS may be used for demodulating signals, CSI-RS may be used for channel estimation, etc.).

If so, at 330 the base station and/or UE may identify or otherwise determine which channel(s), symbol(s), port(s), etc., are associated with the reference signal. For example, the control signaling may implicitly and/or explicitly identify or otherwise indicate which channels are associated with the reference signal, which symbol periods are associated with the reference signal (e.g., using time window indicator(s) conveyed in the control signaling), which port(s) of the channels are associated with the reference signal, which port(s) of the reference signal are to be used (e.g., shared) across the channel(s)/function(s), and the like.

Accordingly and at 335, the base station and/or UE may perform the set of functions on the single carrier signals based on the reference signal. For example, the reference signal may be used for channel estimation functions, beam management functions, location/position tracking functions, decoding operation functions, synchronization functions, and the like.

Figure 4:
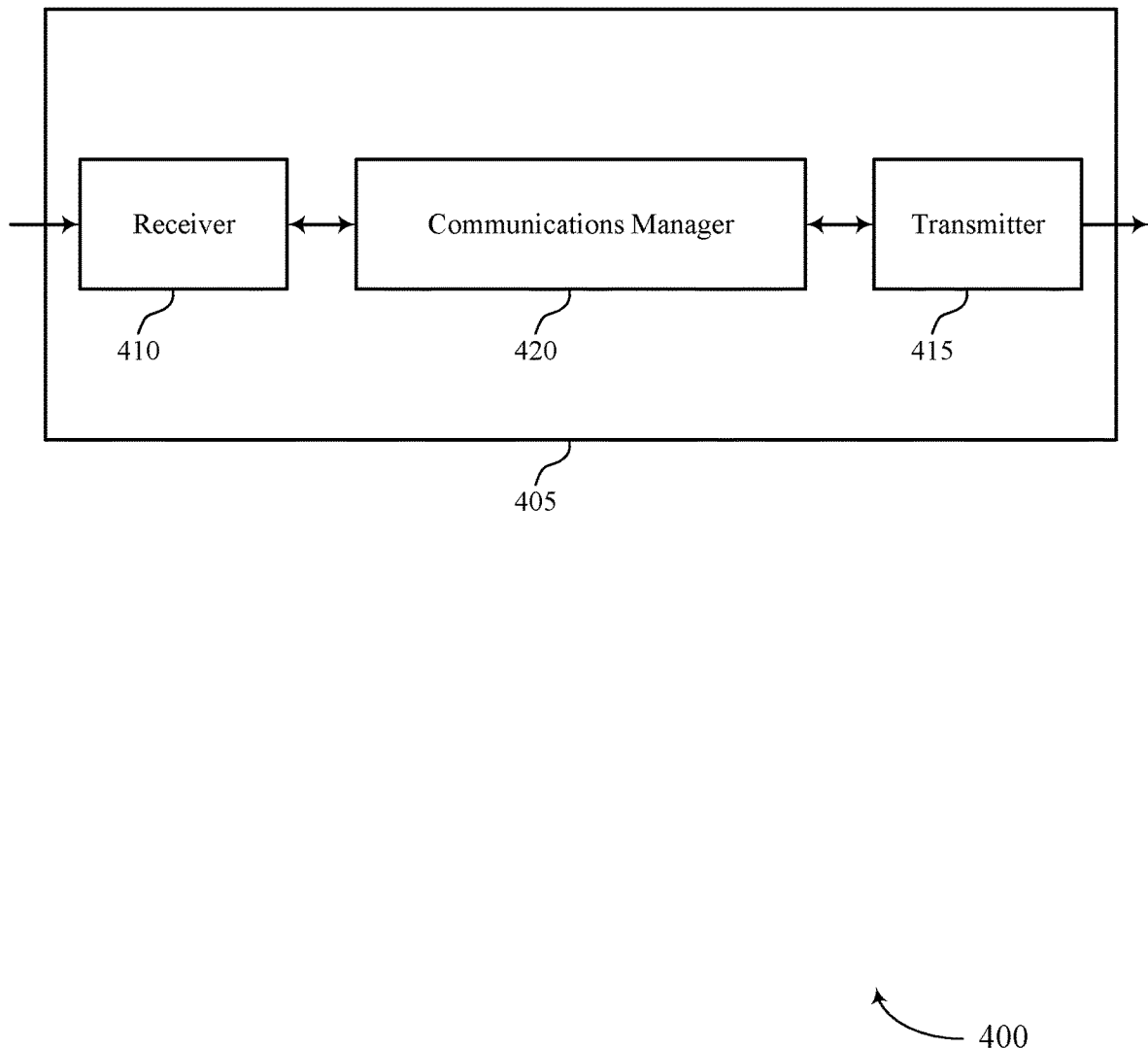
FIGS. 4 and 5 show block diagrams of devices that support multi-purpose shared time domain reference signal for higher bands in accordance with aspects of the present disclosure.

FIG. 4 shows a block diagram 400 of a device 405 that supports multi-purpose shared time domain reference signal for higher bands in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to multi-purpose shared time domain reference signal for higher bands). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to multi-purpose shared time domain reference signal for higher bands). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of multi-purpose shared time domain reference signal for higher bands as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving control signaling identifying a configuration for a reference signal including a single carrier waveform and associated with single carrier signals for a set of multiple symbol periods, the configuration indicating a set of multiple channels associated with the reference signal and a set of functions associated with the reference signal. The communications manager 420 may be configured as or otherwise support a means for receiving, according to the configuration, the reference signal in a first one or more symbol periods of the set of multiple symbol periods and the single carrier signals on the set of multiple channels in a second one or more symbol periods of the set of multiple symbol periods. The communications manager 420 may be configured as or otherwise support a means for performing the set of functions on the received single carrier signals based on the received reference signal.

Additionally or alternatively, the communications manager 420 may support wireless communication at a UE in accordance with examples as disclosed herein. For example, the communications manager 420 may be configured as or otherwise support a means for receiving control signaling identifying a configuration for a reference signal including a single carrier waveform and associated with single carrier signals for a set of multiple symbol periods, the configuration indicating a set of multiple channels associated with the reference signal and a set of functions associated with the reference signal. The communications manager 420 may be configured as or otherwise support a means for transmitting, according to the configuration, the reference signal in a first one or more symbol periods of the set of multiple symbol periods. The communications manager 420 may be configured as or otherwise support a means for transmitting the single carrier signals in a second one or more symbol periods of the set of multiple symbol periods, where the set of functions are to be performed on the transmitted single carrier signals based on the transmitted reference signal.

By including or configuring the communications manager 420 in accordance with examples as described herein, the device 405 (e.g., a processor controlling or otherwise coupled to the receiver 410, the transmitter 415, the communications manager 420, or a combination thereof) may support techniques for reusing a single carrier reference signal across a plurality of channels and for multiple functions on single carrier signals. This technique may reduce overhead and conserve resources by allowing the single carrier waveform reference signal to be used for multiple purposes.

Figure 5:
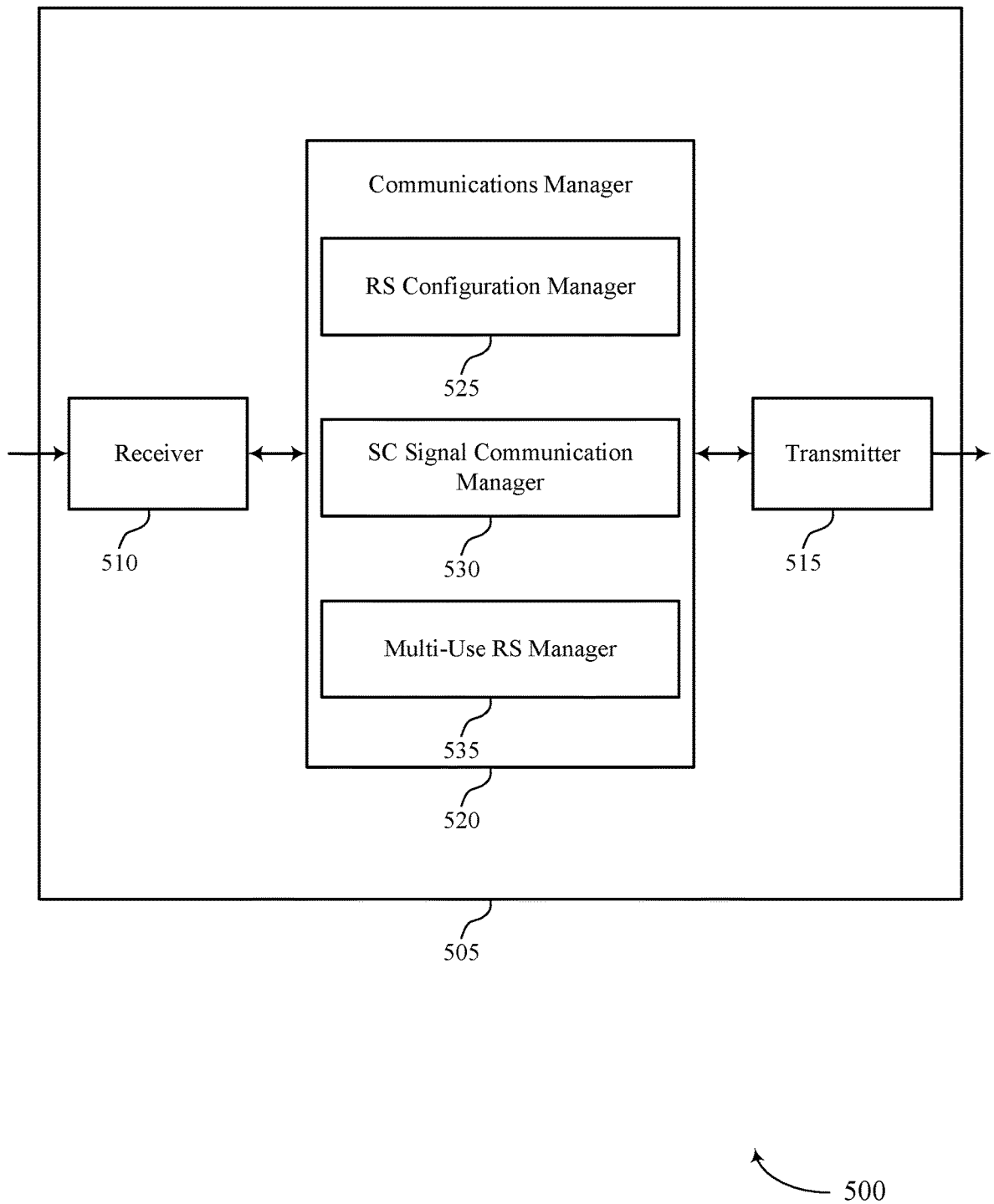

FIG. 5 shows a block diagram 500 of a device 505 that supports multi-purpose shared time domain reference signal for higher bands in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to multi-purpose shared time domain reference signal for higher bands). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to multi-purpose shared time domain reference signal for higher bands). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of multi-purpose shared time domain reference signal for higher bands as described herein. For example, the communications manager 520 may include an RS configuration manager 525, an SC signal communication manager 530, a multi-use RS manager 535, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The RS configuration manager 525 may be configured as or otherwise support a means for receiving control signaling identifying a configuration for a reference signal including a single carrier waveform and associated with single carrier signals for a set of multiple symbol periods, the configuration indicating a set of multiple channels associated with the reference signal and a set of functions associated with the reference signal. The SC signal communication manager 530 may be configured as or otherwise support a means for receiving, according to the configuration, the reference signal in a first one or more symbol periods of the set of multiple symbol periods and the single carrier signals on the set of multiple channels in a second one or more symbol periods of the set of multiple symbol periods. The multi-use RS manager 535 may be configured as or otherwise support a means for performing the set of functions on the received single carrier signals based on the received reference signal.

Additionally or alternatively, the communications manager 520 may support wireless communication at a UE in accordance with examples as disclosed herein. The RS configuration manager 525 may be configured as or otherwise support a means for receiving control signaling identifying a configuration for a reference signal including a single carrier waveform and associated with single carrier signals for a set of multiple symbol periods, the configuration indicating a set of multiple channels associated with the reference signal and a set of functions associated with the reference signal. The SC signal communication manager 530 may be configured as or otherwise support a means for transmitting, according to the configuration, the reference signal in a first one or more symbol periods of the set of multiple symbol periods. The multi-use RS manager 535 may be configured as or otherwise support a means for transmitting the single carrier signals in a second one or more symbol periods of the set of multiple symbol periods, where the set of functions are to be performed on the transmitted single carrier signals based on the transmitted reference signal.

Figure 6:
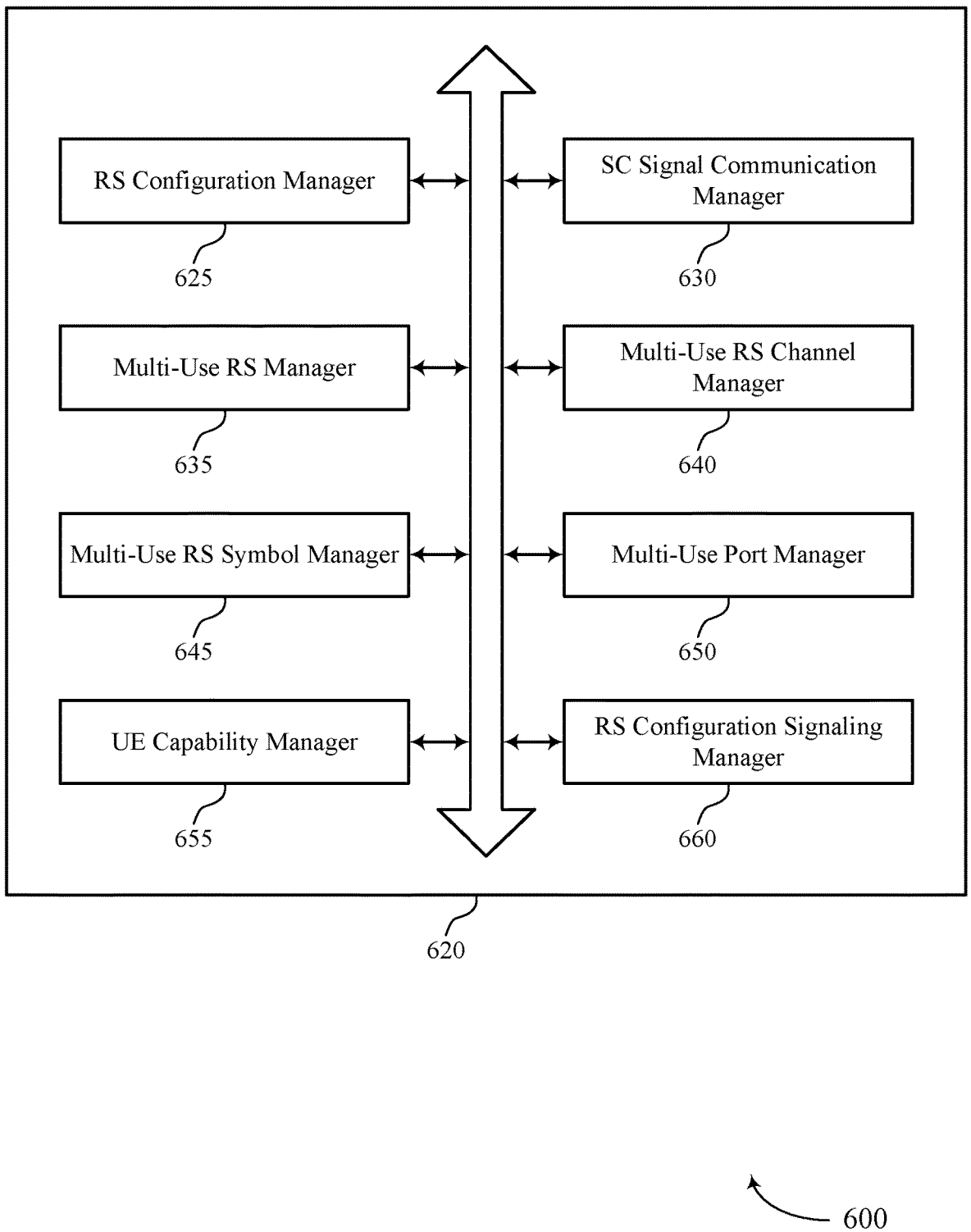
FIG. 6 shows a block diagram of a communications manager that supports multi-purpose shared time domain reference signal for higher bands in accordance with aspects of the present disclosure.

FIG. 6 shows a block diagram 600 of a communications manager 620 that supports multi-purpose shared time domain reference signal for higher bands in accordance with aspects of the present disclosure. The communications manager 620 may be an example of aspects of a communications manager 420, a communications manager 520, or both, as described herein. The communications manager 620, or various components thereof, may be an example of means for performing various aspects of multi-purpose shared time domain reference signal for higher bands as described herein. For example, the communications manager 620 may include an RS configuration manager 625, an SC signal communication manager 630, a multi-use RS manager 635, a multi-use RS channel manager 640, a multi-use RS symbol manager 645, a multi-use port manager 650, a UE capability manager 655, an RS configuration signaling manager 660, or any combination thereof. Each of these components may communicate, directly or indirectly, with one another (e.g., via one or more buses).

The communications manager 620 may support wireless communication at a UE in accordance with examples as disclosed herein. The RS configuration manager 625 may be configured as or otherwise support a means for receiving control signaling identifying a configuration for a reference signal including a single carrier waveform and associated with single carrier signals for a set of multiple symbol periods, the configuration indicating a set of multiple channels associated with the reference signal and a set of functions associated with the reference signal. The SC signal communication manager 630 may be configured as or otherwise support a means for receiving, according to the configuration, the reference signal in a first one or more symbol periods of the set of multiple symbol periods and the single carrier signals on the set of multiple channels in a second one or more symbol periods of the set of multiple symbol periods. The multi-use RS manager 635 may be configured as or otherwise support a means for performing the set of functions on the received single carrier signals based on the received reference signal.

In some examples, the multi-use RS channel manager 640 may be configured as or otherwise support a means for identifying the set of multiple channels based on one or more channel indicators in the control signaling.

In some examples, the multi-use RS symbol manager 645 may be configured as or otherwise support a means for identifying the set of multiple symbol periods based on one or more time window indicators in the control signaling. In some examples, the multi-use RS symbol manager 645 may be configured as or otherwise support a means for identifying the set of multiple channels based on the set of multiple symbol periods. In some examples, the multi-use RS symbol manager 645 may be configured as or otherwise support a means for determining a set of channels that are within the set of multiple symbol periods identified from the one or more time window indicators, where the set of multiple channels indicated by the configuration include the determined set of channels.

In some examples, the multi-use port manager 650 may be configured as or otherwise support a means for identifying one or more ports from a set of multiple ports based on the configuration, the one or more ports for performing the set of functions on the received single carrier signals based on the received reference signal.

In some examples, the UE capability manager 655 may be configured as or otherwise support a means for transmitting a UE capability message to a base station identifying that the UE supports performing the set of functions based on the received reference signal including the single carrier waveform and associated with the single carrier signals for the set of multiple symbol periods and the set of multiple channels, where the configuration is based on the UE capability message.

In some examples, the RS configuration signaling manager 660 may be configured as or otherwise support a means for receiving the control signal identifying the configuration in a semi-static configuration signal, a dynamic configuration signal, or both. In some examples, the RS configuration signaling manager 660 may be configured as or otherwise support a means for receiving the control signal identifying the configuration in a UE-specific configuration signal. In some examples, the RS configuration signaling manager 660 may be configured as or otherwise support a means for receiving the control signal identifying the configuration in a multi-UE configuration signal.

Additionally or alternatively, the communications manager 620 may support wireless communication at a UE in accordance with examples as disclosed herein. In some examples, the RS configuration manager 625 may be configured as or otherwise support a means for receiving control signaling identifying a configuration for a reference signal including a single carrier waveform and associated with single carrier signals for a set of multiple symbol periods, the configuration indicating a set of multiple channels associated with the reference signal and a set of functions associated with the reference signal. In some examples, the SC signal communication manager 630 may be configured as or otherwise support a means for transmitting, according to the configuration, the reference signal in a first one or more symbol periods of the set of multiple symbol periods. In some examples, the multi-use RS manager 635 may be configured as or otherwise support a means for transmitting the single carrier signals in a second one or more symbol periods of the set of multiple symbol periods, where the set of functions are to be performed on the transmitted single carrier signals based on the transmitted reference signal.

In some examples, the multi-use RS channel manager 640 may be configured as or otherwise support a means for identifying the set of multiple channels based on one or more channel indicators in the control signaling.

In some examples, the multi-use RS symbol manager 645 may be configured as or otherwise support a means for identifying the set of multiple symbol periods based on one or more time window indicators in the control signaling. In some examples, the multi-use RS symbol manager 645 may be configured as or otherwise support a means for identifying the set of multiple channels based on the set of multiple symbol periods.

In some examples, the multi-use RS symbol manager 645 may be configured as or otherwise support a means for determining a set of channels that are within the set of multiple symbol periods identified from the one or more time window indicators, where the set of multiple channels indicated by the configuration include the determined set of channels.

In some examples, the multi-use port manager 650 may be configured as or otherwise support a means for identifying one or more ports from a set of multiple ports based on the configuration, the one or more ports for performing the set of functions on the received single carrier signals based on the received reference signal.

In some examples, the UE capability manager 655 may be configured as or otherwise support a means for transmitting a UE capability message to a base station identifying that the UE supports performing the set of functions based on the received reference signal including the single carrier waveform and associated with the single carrier signals for the set of multiple symbol periods and the set of multiple channels, where the configuration is based on the UE capability message.

In some examples, the RS configuration signaling manager 660 may be configured as or otherwise support a means for receiving the control signal identifying the configuration in a semi-static configuration signal, a dynamic configuration signal, or both. In some examples, the RS configuration signaling manager 660 may be configured as or otherwise support a means for receiving the control signal identifying the configuration in a UE-specific configuration signal. In some examples, the RS configuration signaling manager 660 may be configured as or otherwise support a means for receiving the control signal identifying the configuration in a multi-UE configuration signal.

Figure 7:
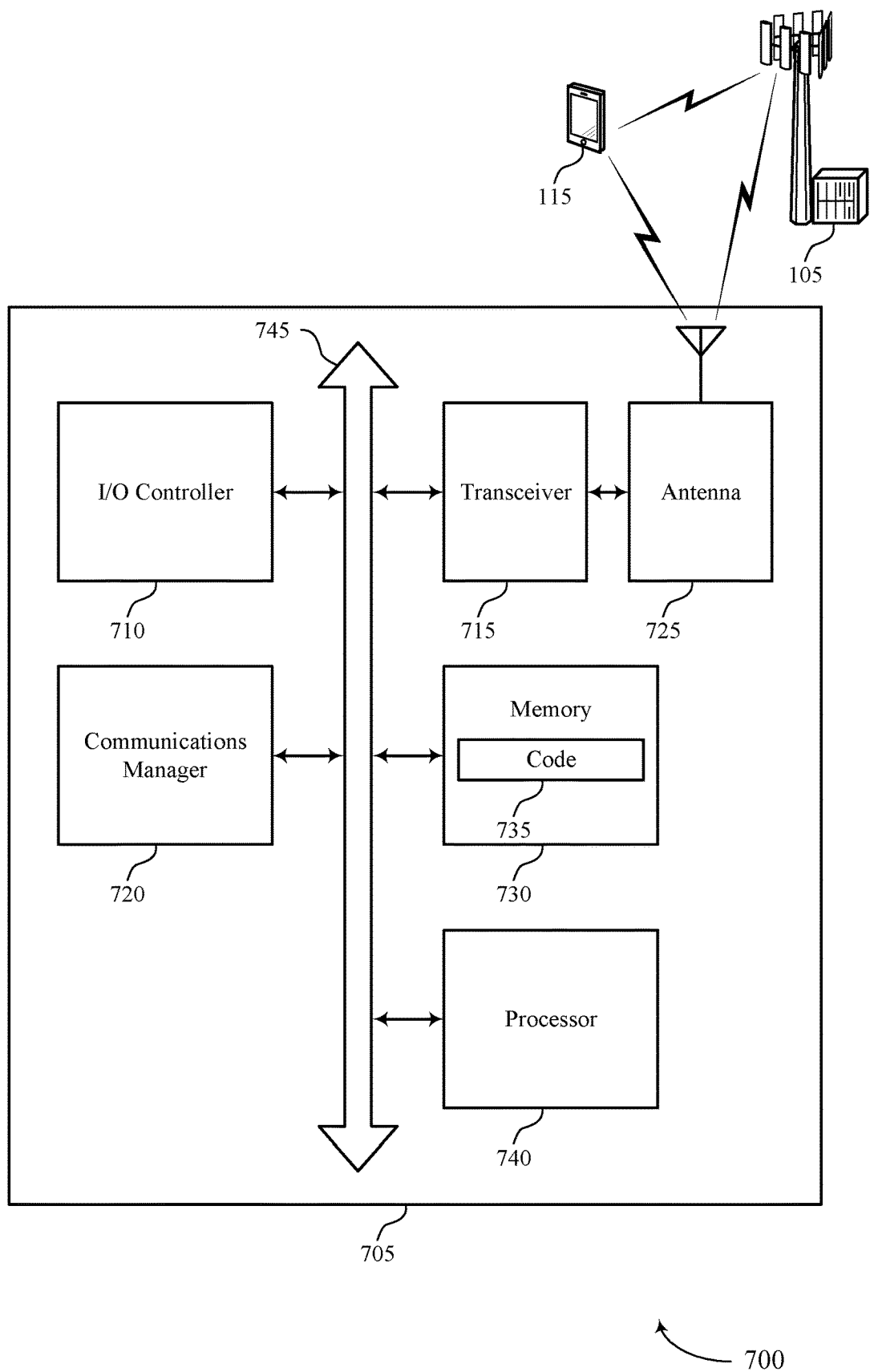
FIG. 7 shows a diagram of a system including a device that supports multi-purpose shared time domain reference signal for higher bands in accordance with aspects of the present disclosure.

FIG. 7 shows a diagram of a system 700 including a device 705 that supports multi-purpose shared time domain reference signal for higher bands in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725. The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting multi-purpose shared time domain reference signal for higher bands). For example, the device 705 or a component of the device 705 may include a processor 740 and memory 730 coupled to the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving control signaling identifying a configuration for a reference signal including a single carrier waveform and associated with single carrier signals for a set of multiple symbol periods, the configuration indicating a set of multiple channels associated with the reference signal and a set of functions associated with the reference signal. The communications manager 720 may be configured as or otherwise support a means for receiving, according to the configuration, the reference signal in a first one or more symbol periods of the set of multiple symbol periods and the single carrier signals on the set of multiple channels in a second one or more symbol periods of the set of multiple symbol periods. The communications manager 720 may be configured as or otherwise support a means for performing the set of functions on the received single carrier signals based on the received reference signal.

Additionally or alternatively, the communications manager 720 may support wireless communication at a UE in accordance with examples as disclosed herein. For example, the communications manager 720 may be configured as or otherwise support a means for receiving control signaling identifying a configuration for a reference signal including a single carrier waveform and associated with single carrier signals for a set of multiple symbol periods, the configuration indicating a set of multiple channels associated with the reference signal and a set of functions associated with the reference signal. The communications manager 720 may be configured as or otherwise support a means for transmitting, according to the configuration, the reference signal in a first one or more symbol periods of the set of multiple symbol periods. The communications manager 720 may be configured as or otherwise support a means for transmitting the single carrier signals in a second one or more symbol periods of the set of multiple symbol periods, where the set of functions are to be performed on the transmitted single carrier signals based on the transmitted reference signal.

By including or configuring the communications manager 720 in accordance with examples as described herein, the device 705 may support techniques for reusing a single carrier reference signal across a plurality of channels and for multiple functions on single carrier signals. This technique may reduce overhead and conserve resources by allowing the single carrier waveform reference signal to be used for multiple purposes.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of multi-purpose shared time domain reference signal for higher bands as described herein, or the processor 740 and the memory 730 may be otherwise configured to perform or support such operations.

Figure 8:
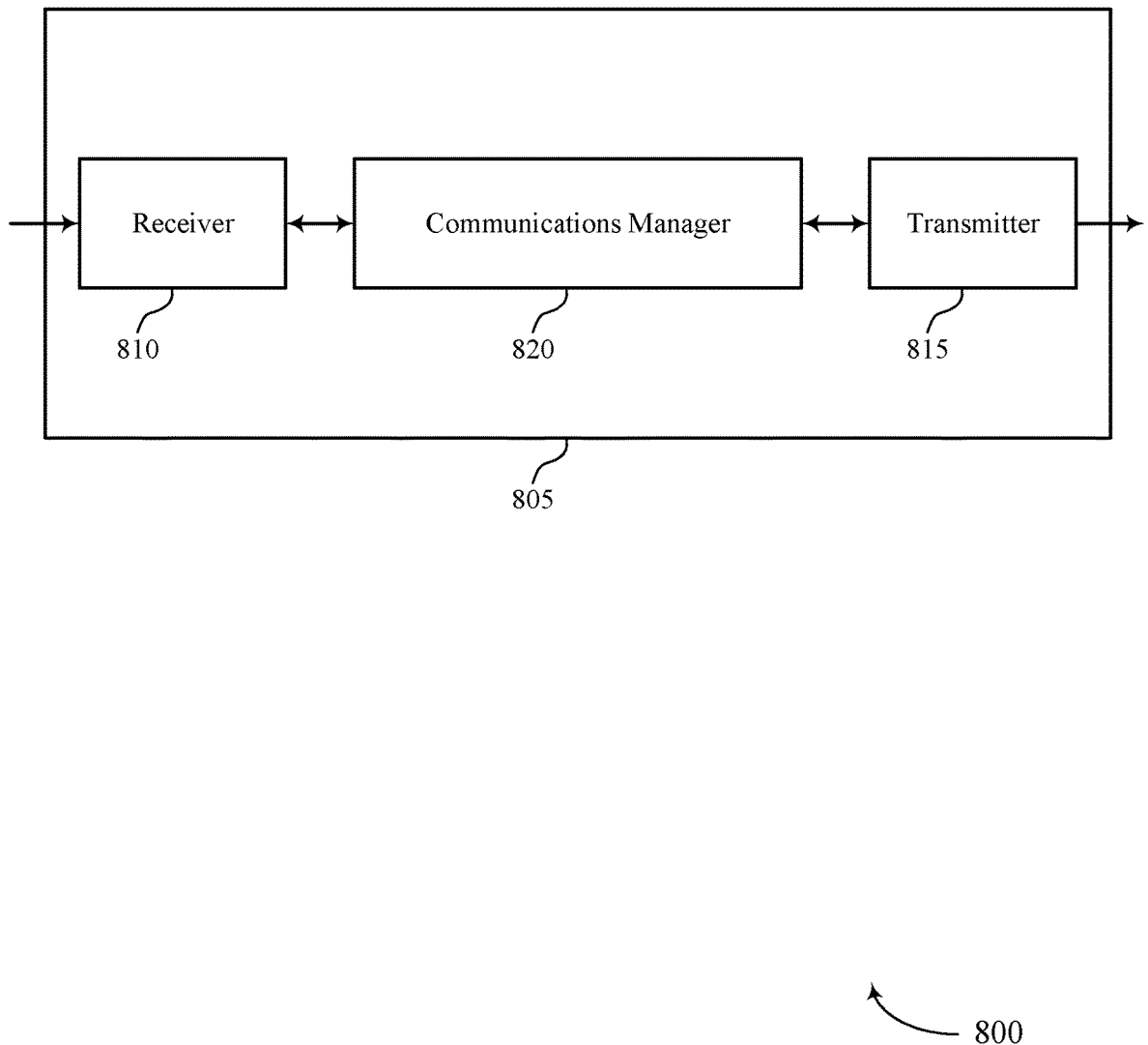
FIGS. 8 and 9 show block diagrams of devices that support multi-purpose shared time domain reference signal for higher bands in accordance with aspects of the present disclosure.

FIG. 8 shows a block diagram 800 of a device 805 that supports multi-purpose shared time domain reference signal for higher bands in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to multi-purpose shared time domain reference signal for higher bands). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to multi-purpose shared time domain reference signal for higher bands). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of multi-purpose shared time domain reference signal for higher bands as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting control signaling identifying a configuration for a reference signal including a single carrier waveform and associated with single carrier signals for a set of multiple symbol periods, the configuration indicating a set of multiple channels associated with the reference signal and a set of functions associated with the reference signal. The communications manager 820 may be configured as or otherwise support a means for transmitting, according to the configuration, the reference signal in a first one or more symbol periods of the set of multiple symbol periods. The communications manager 820 may be configured as or otherwise support a means for transmitting the single carrier signals on the set of multiple channels in a second one or more symbol periods of the set of multiple symbol periods, where the set of functions are to be performed on the transmitted single carrier signals based on the transmitted reference signal.

Additionally or alternatively, the communications manager 820 may support wireless communication at a base station in accordance with examples as disclosed herein. For example, the communications manager 820 may be configured as or otherwise support a means for transmitting control signaling identifying a configuration for a reference signal including a single carrier waveform and associated with single carrier signals for a set of multiple symbol periods, the configuration identifying a set of multiple channels associated with the reference signal and a set of functions associated with the reference signal. The communications manager 820 may be configured as or otherwise support a means for receiving, according to the configuration, the reference signal in a first one or more symbol periods of the set of multiple symbol periods and receiving the single carrier signals in a second one or more symbol periods of the set of multiple symbol periods. The communications manager 820 may be configured as or otherwise support a means for performing the set of functions on the received single carrier signals based on the transmitted reference signal.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for reusing a single carrier reference signal across a plurality of channels and for multiple functions on single carrier signals. This technique may reduce overhead and conserve resources by allowing the single carrier waveform reference signal to be used for multiple purposes.

Figure 9:
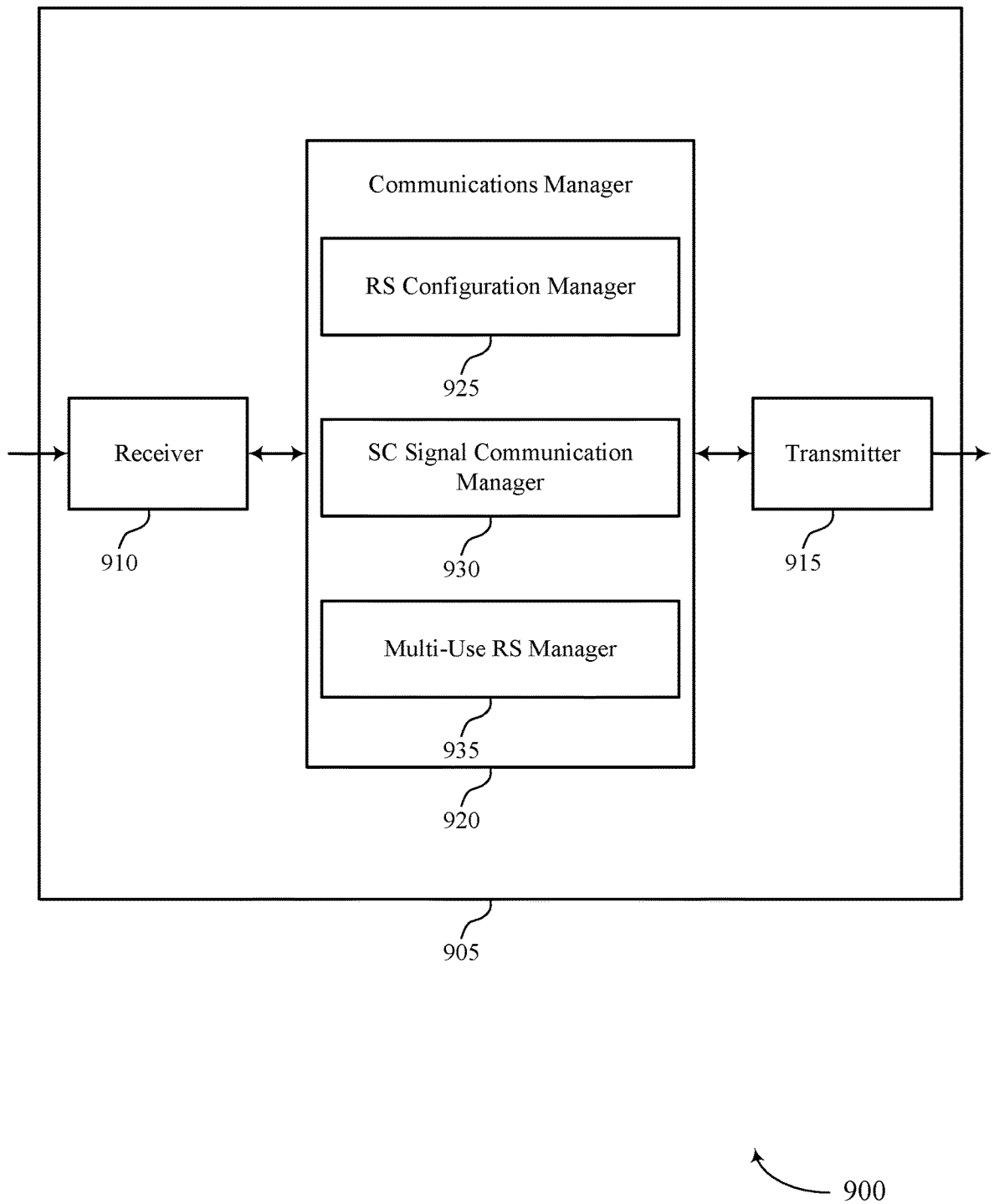

FIG. 9 shows a block diagram 900 of a device 905 that supports multi-purpose shared time domain reference signal for higher bands in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to multi-purpose shared time domain reference signal for higher bands). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to multi-purpose shared time domain reference signal for higher bands). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of multi-purpose shared time domain reference signal for higher bands as described herein. For example, the communications manager 920 may include an RS configuration manager 925, an SC signal communication manager 930, a multi-use RS manager 935, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The RS configuration manager 925 may be configured as or otherwise support a means for transmitting control signaling identifying a configuration for a reference signal including a single carrier waveform and associated with single carrier signals for a set of multiple symbol periods, the configuration indicating a set of multiple channels associated with the reference signal and a set of functions associated with the reference signal. The SC signal communication manager 930 may be configured as or otherwise support a means for transmitting, according to the configuration, the reference signal in a first one or more symbol periods of the set of multiple symbol periods. The multi-use RS manager 935 may be configured as or otherwise support a means for transmitting the single carrier signals on the set of multiple channels in a second one or more symbol periods of the set of multiple symbol periods, where the set of functions are to be performed on the transmitted single carrier signals based on the transmitted reference signal.

Additionally or alternatively, the communications manager 920 may support wireless communication at a base station in accordance with examples as disclosed herein. The RS configuration manager 925 may be configured as or otherwise support a means for transmitting control signaling identifying a configuration for a reference signal including a single carrier waveform and associated with single carrier signals for a set of multiple symbol periods, the configuration identifying a set of multiple channels associated with the reference signal and a set of functions associated with the reference signal. The SC signal communication manager 930 may be configured as or otherwise support a means for receiving, according to the configuration, the reference signal in a first one or more symbol periods of the set of multiple symbol periods and receiving the single carrier signals in a second one or more symbol periods of the set of multiple symbol periods. The multi-use RS manager 935 may be configured as or otherwise support a means for performing the set of functions on the received single carrier signals based on the transmitted reference signal.

Figure 10:
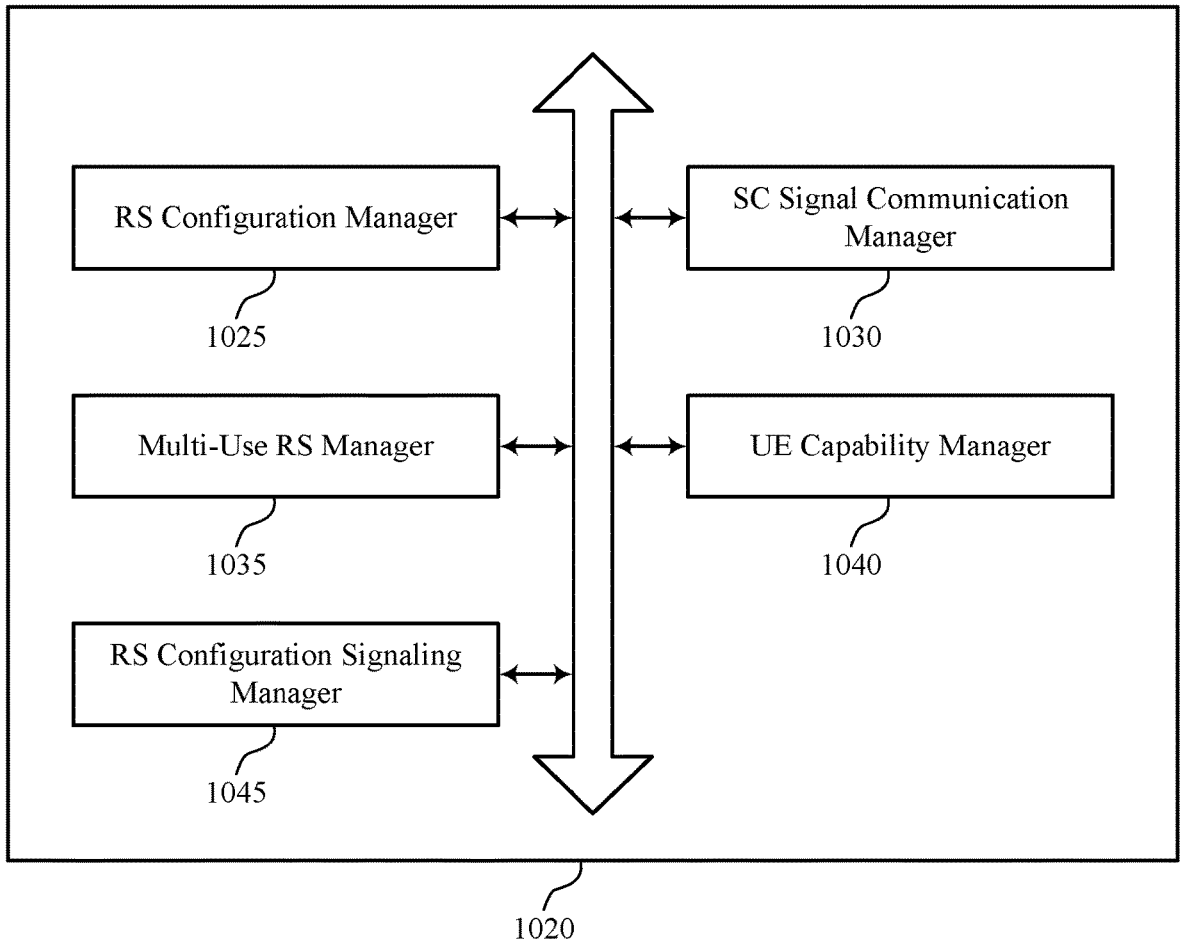
FIG. 10 shows a block diagram of a communications manager that supports multi-purpose shared time domain reference signal for higher bands in accordance with aspects of the present disclosure.

FIG. 10 shows a block diagram 1000 of a communications manager 1020 that supports multi-purpose shared time domain reference signal for higher bands in accordance with aspects of the present disclosure. The communications manager 1020 may be an example of aspects of a communications manager 820, a communications manager 920, or both, as described herein. The communications manager 1020, or various components thereof, may be an example of means for performing various aspects of multi-purpose shared time domain reference signal for higher bands as described herein. For example, the communications manager 1020 may include an RS configuration manager 1025, an SC signal communication manager 1030, a multi-use RS manager 1035, a UE capability manager 1040, an RS configuration signaling manager 1045, or any combination thereof. Each of these components may communicate, directly or indirectly, with one another (e.g., via one or more buses).

The communications manager 1020 may support wireless communication at a base station in accordance with examples as disclosed herein. The RS configuration manager 1025 may be configured as or otherwise support a means for transmitting control signaling identifying a configuration for a reference signal including a single carrier waveform and associated with single carrier signals for a set of multiple symbol periods, the configuration indicating a set of multiple channels associated with the reference signal and a set of functions associated with the reference signal. The SC signal communication manager 1030 may be configured as or otherwise support a means for transmitting, according to the configuration, the reference signal in a first one or more symbol periods of the set of multiple symbol periods. The multi-use RS manager 1035 may be configured as or otherwise support a means for transmitting the single carrier signals on the set of multiple channels in a second one or more symbol periods of the set of multiple symbol periods, where the set of functions are to be performed on the transmitted single carrier signals based on the transmitted reference signal.

In some examples, the UE capability manager 1040 may be configured as or otherwise support a means for receiving a UE capability message identifying that a UE supports performing the set of functions based on the transmitted reference signal including the single carrier waveform and associated with the single carrier signals for the set of multiple symbol periods and the set of multiple channels, where the configuration is based on the UE capability message.

In some examples, the RS configuration signaling manager 1045 may be configured as or otherwise support a means for transmitting the control signal identifying the configuration in a semi-static configuration signal, a dynamic configuration signal, or both. In some examples, the RS configuration signaling manager 1045 may be configured as or otherwise support a means for transmitting the control signal identifying the configuration in a UE-specific configuration signal. In some examples, the RS configuration signaling manager 1045 may be configured as or otherwise support a means for transmitting the control signal identifying the configuration in a multi-UE configuration signal.

Additionally or alternatively, the communications manager 1020 may support wireless communication at a base station in accordance with examples as disclosed herein. In some examples, the RS configuration manager 1025 may be configured as or otherwise support a means for transmitting control signaling identifying a configuration for a reference signal including a single carrier waveform and associated with single carrier signals for a set of multiple symbol periods, the configuration identifying a set of multiple channels associated with the reference signal and a set of functions associated with the reference signal. In some examples, the SC signal communication manager 1030 may be configured as or otherwise support a means for receiving, according to the configuration, the reference signal in a first one or more symbol periods of the set of multiple symbol periods and receiving the single carrier signals in a second one or more symbol periods of the set of multiple symbol periods. In some examples, the multi-use RS manager 1035 may be configured as or otherwise support a means for performing the set of functions on the received single carrier signals based on the transmitted reference signal.

In some examples, the UE capability manager 1040 may be configured as or otherwise support a means for receiving a UE capability message identifying that a UE supports performing the set of functions based on the transmitted reference signal including the single carrier waveform and associated with the single carrier signals for the set of multiple symbol periods and the set of multiple channels, where the configuration is based on the UE capability message.

In some examples, the RS configuration signaling manager 1045 may be configured as or otherwise support a means for transmitting the control signal identifying the configuration in a semi-static configuration signal, a dynamic configuration signal, or both. In some examples, the RS configuration signaling manager 1045 may be configured as or otherwise support a means for transmitting the control signal identifying the configuration in a UE-specific configuration signal. In some examples, the RS configuration signaling manager 1045 may be configured as or otherwise support a means for transmitting the control signal identifying the configuration in a multi-UE configuration signal.

Figure 11:
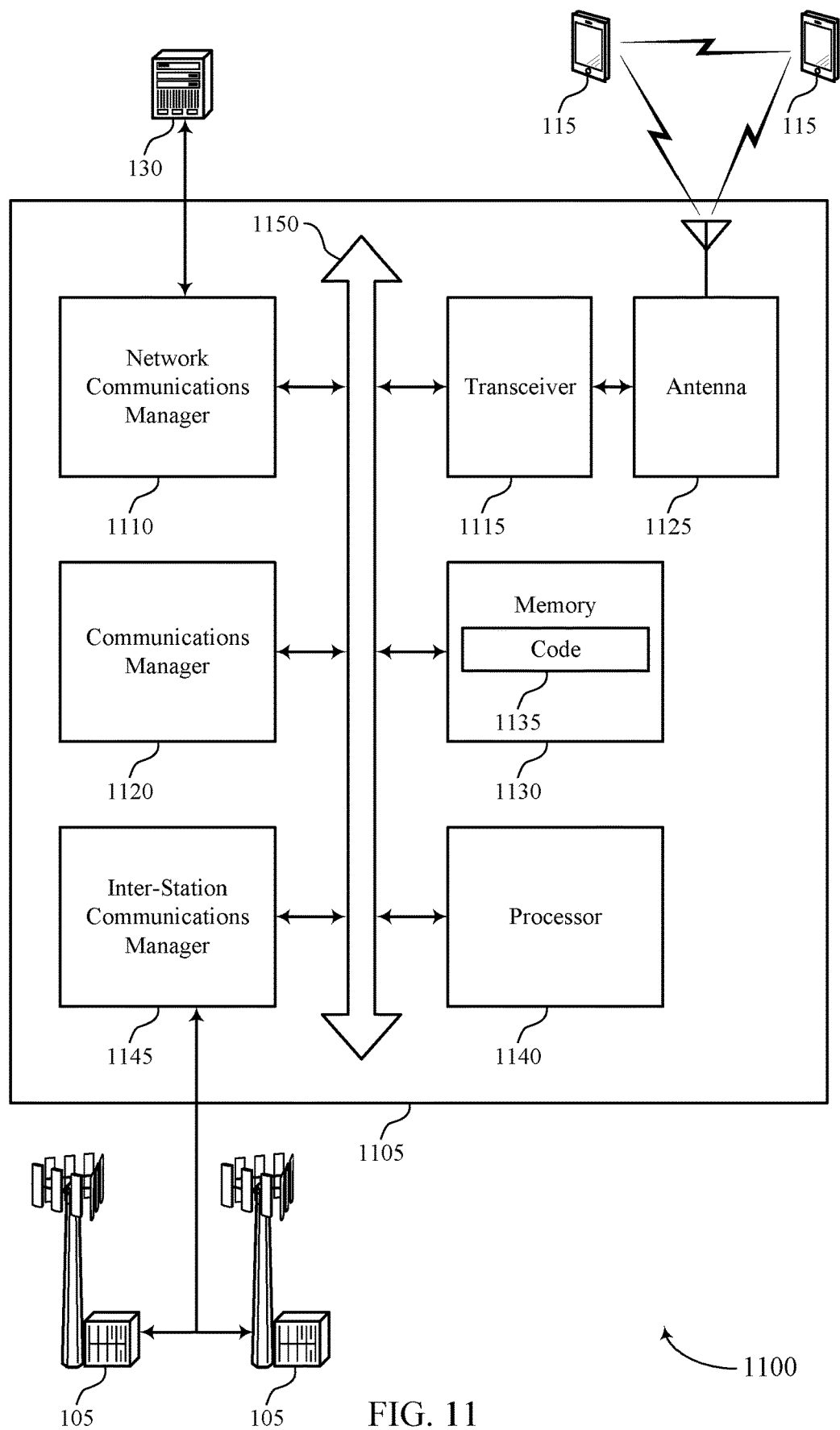
FIG. 11 shows a diagram of a system including a device that supports multi-purpose shared time domain reference signal for higher bands in accordance with aspects of the present disclosure.

FIG. 11 shows a diagram of a system 1100 including a device 1105 that supports multi-purpose shared time domain reference signal for higher bands in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting multi-purpose shared time domain reference signal for higher bands). For example, the device 1105 or a component of the device 1105 may include a processor 1140 and memory 1130 coupled to the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting control signaling identifying a configuration for a reference signal including a single carrier waveform and associated with single carrier signals for a set of multiple symbol periods, the configuration indicating a set of multiple channels associated with the reference signal and a set of functions associated with the reference signal. The communications manager 1120 may be configured as or otherwise support a means for transmitting, according to the configuration, the reference signal in a first one or more symbol periods of the set of multiple symbol periods. The communications manager 1120 may be configured as or otherwise support a means for transmitting the single carrier signals on the set of multiple channels in a second one or more symbol periods of the set of multiple symbol periods, where the set of functions are to be performed on the transmitted single carrier signals based on the transmitted reference signal.

Additionally or alternatively, the communications manager 1120 may support wireless communication at a base station in accordance with examples as disclosed herein. For example, the communications manager 1120 may be configured as or otherwise support a means for transmitting control signaling identifying a configuration for a reference signal including a single carrier waveform and associated with single carrier signals for a set of multiple symbol periods, the configuration identifying a set of multiple channels associated with the reference signal and a set of functions associated with the reference signal. The communications manager 1120 may be configured as or otherwise support a means for receiving, according to the configuration, the reference signal in a first one or more symbol periods of the set of multiple symbol periods and receiving the single carrier signals in a second one or more symbol periods of the set of multiple symbol periods. The communications manager 1120 may be configured as or otherwise support a means for performing the set of functions on the received single carrier signals based on the transmitted reference signal.

By including or configuring the communications manager 1120 in accordance with examples as described herein, the device 1105 may support techniques for reusing a single carrier reference signal across a plurality of channels and for multiple functions on single carrier signals. This technique may reduce overhead and conserve resources by allowing the single carrier waveform reference signal to be used for multiple purposes.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of multi-purpose shared time domain reference signal for higher bands as described herein, or the processor 1140 and the memory 1130 may be otherwise configured to perform or support such operations.

Figure 12:
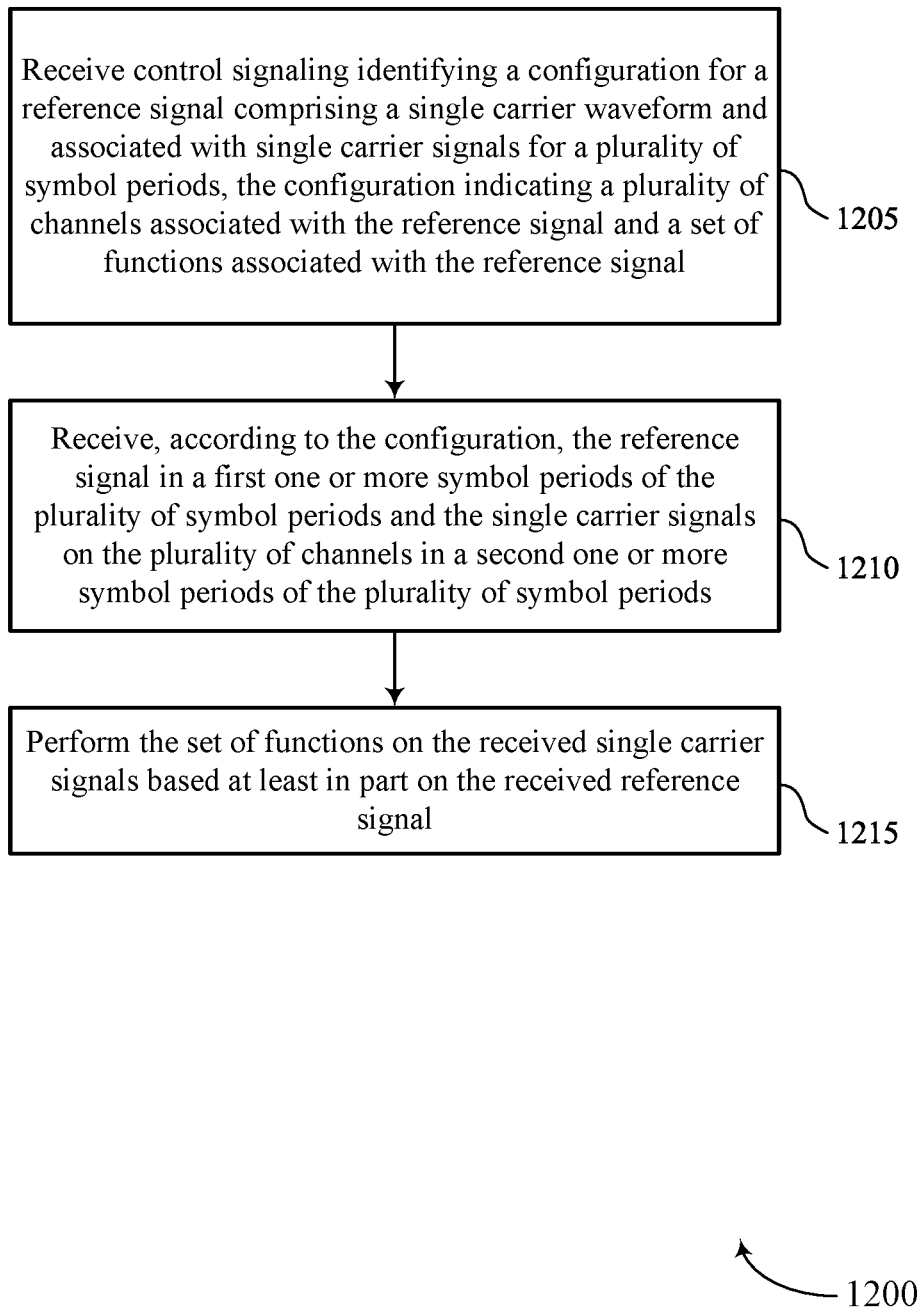
FIGS. 12 through 17 show flowcharts illustrating methods that support multi-purpose shared time domain reference signal for higher bands in accordance with aspects of the present disclosure.

FIG. 12 shows a flowchart illustrating a method 1200 that supports multi-purpose shared time domain reference signal for higher bands in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving control signaling identifying a configuration for a reference signal including a single carrier waveform and associated with single carrier signals for a set of multiple symbol periods, the configuration indicating a set of multiple channels associated with the reference signal and a set of functions associated with the reference signal. The operations of 1205 may be performed in accordance with examples as disclosed herein. In some examples, aspects of the operations of 1205 may be performed by an RS configuration manager 625 as described with reference to FIG. 6.

At 1210, the method may include receiving, according to the configuration, the reference signal in a first one or more symbol periods of the set of multiple symbol periods and the single carrier signals on the set of multiple channels in a second one or more symbol periods of the set of multiple symbol periods. The operations of 1210 may be performed in accordance with examples as disclosed herein. In some examples, aspects of the operations of 1210 may be performed by an SC signal communication manager 630 as described with reference to FIG. 6.

At 1215, the method may include performing the set of functions on the received single carrier signals based on the received reference signal. The operations of 1215 may be performed in accordance with examples as disclosed herein. In some examples, aspects of the operations of 1215 may be performed by a multi-use RS manager 635 as described with reference to FIG. 6.

Figure 13:
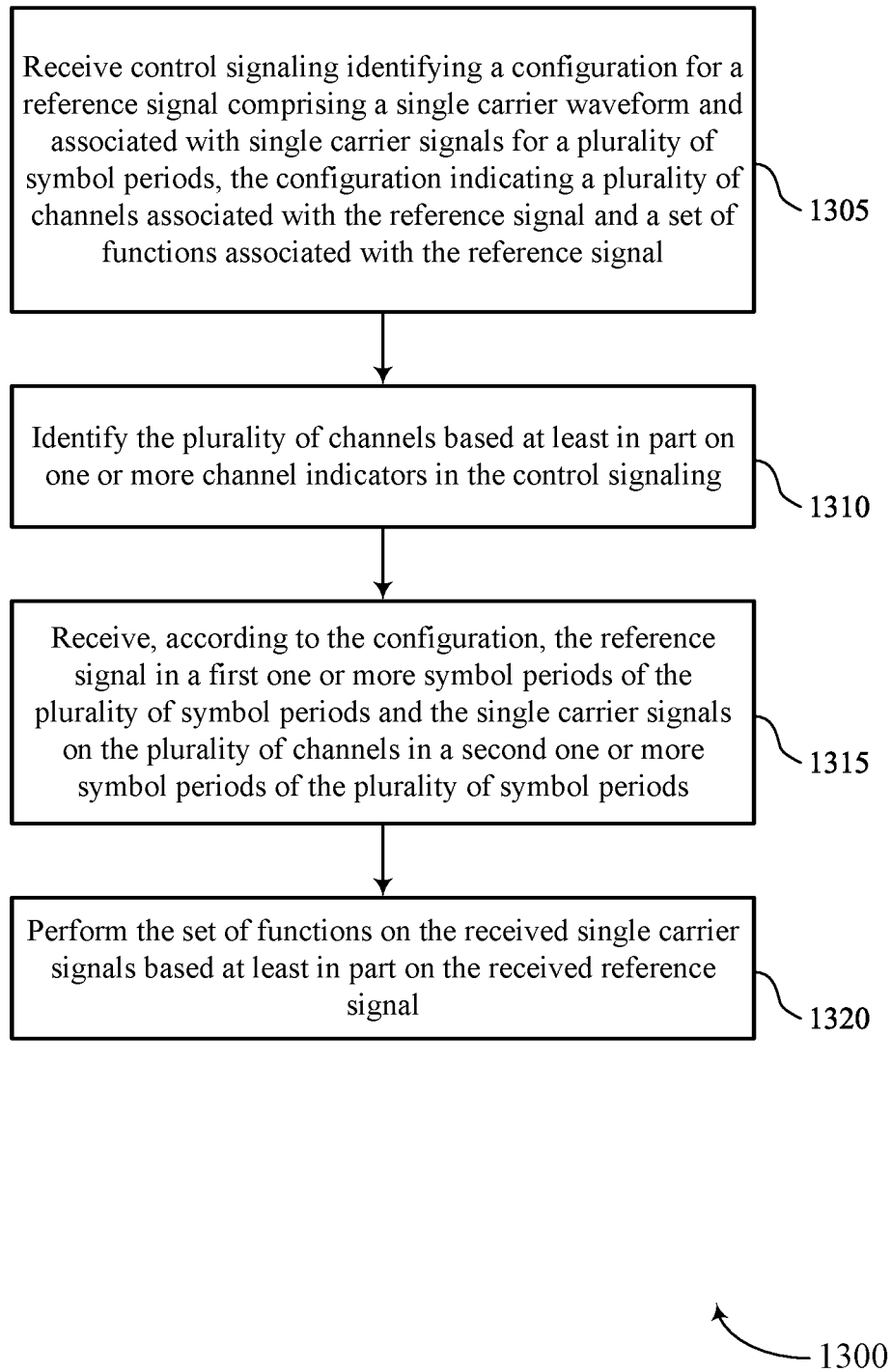

FIG. 13 shows a flowchart illustrating a method 1300 that supports multi-purpose shared time domain reference signal for higher bands in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving control signaling identifying a configuration for a reference signal including a single carrier waveform and associated with single carrier signals for a set of multiple symbol periods, the configuration indicating a set of multiple channels associated with the reference signal and a set of functions associated with the reference signal. The operations of 1305 may be performed in accordance with examples as disclosed herein. In some examples, aspects of the operations of 1305 may be performed by an RS configuration manager 625 as described with reference to FIG. 6.

At 1310, the method may include identifying the set of multiple channels based on one or more channel indicators in the control signaling. The operations of 1310 may be performed in accordance with examples as disclosed herein. In some examples, aspects of the operations of 1310 may be performed by a multi-use RS channel manager 640 as described with reference to FIG. 6.

At 1315, the method may include receiving, according to the configuration, the reference signal in a first one or more symbol periods of the set of multiple symbol periods and the single carrier signals on the set of multiple channels in a second one or more symbol periods of the set of multiple symbol periods. The operations of 1315 may be performed in accordance with examples as disclosed herein. In some examples, aspects of the operations of 1315 may be performed by an SC signal communication manager 630 as described with reference to FIG. 6.

At 1320, the method may include performing the set of functions on the received single carrier signals based on the received reference signal. The operations of 1320 may be performed in accordance with examples as disclosed herein. In some examples, aspects of the operations of 1320 may be performed by a multi-use RS manager 635 as described with reference to FIG. 6.

Figure 14:
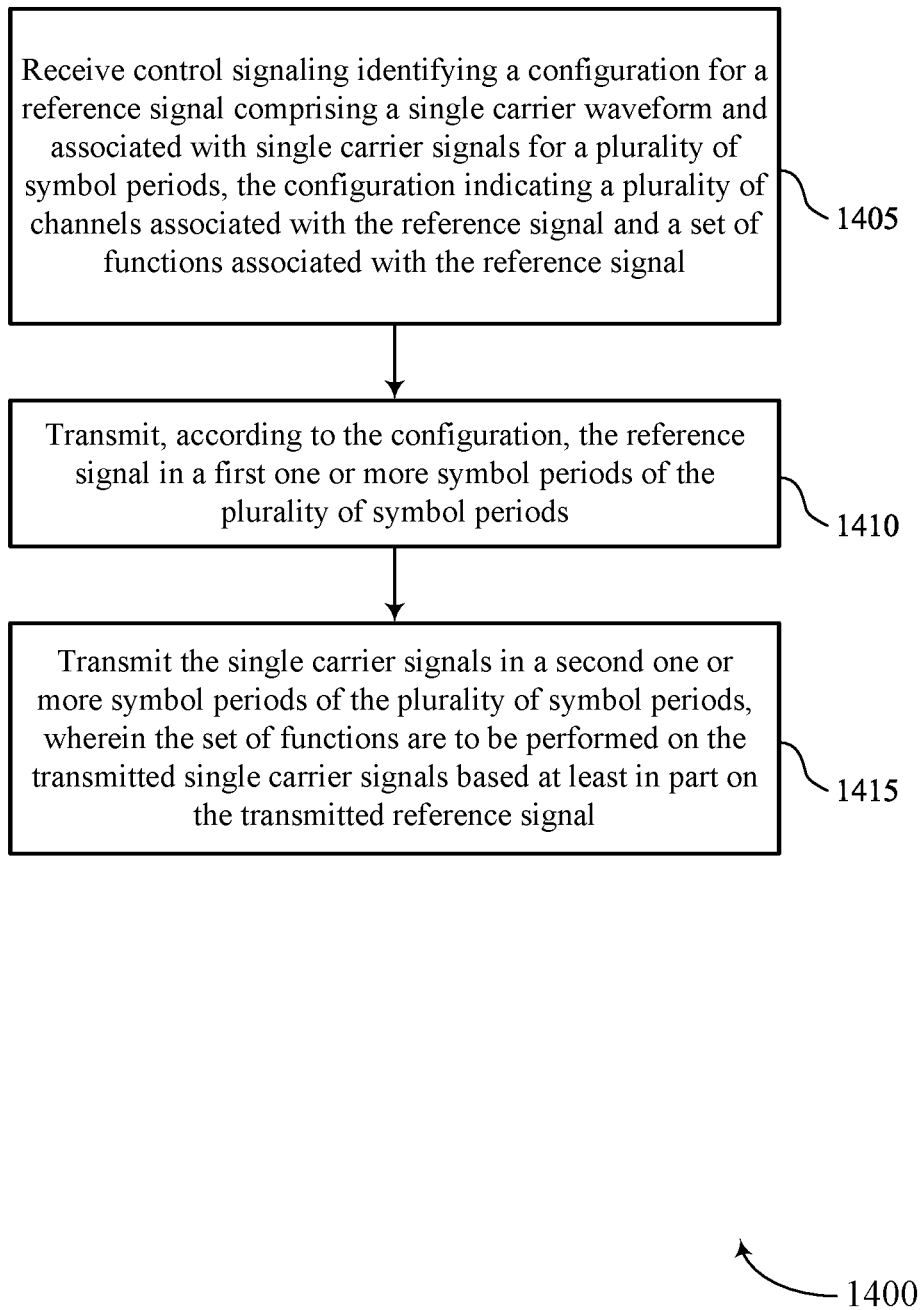

FIG. 14 shows a flowchart illustrating a method 1400 that supports multi-purpose shared time domain reference signal for higher bands in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving control signaling identifying a configuration for a reference signal including a single carrier waveform and associated with single carrier signals for a set of multiple symbol periods, the configuration indicating a set of multiple channels associated with the reference signal and a set of functions associated with the reference signal. The operations of 1405 may be performed in accordance with examples as disclosed herein. In some examples, aspects of the operations of 1405 may be performed by an RS configuration manager 625 as described with reference to FIG. 6.

At 1410, the method may include transmitting, according to the configuration, the reference signal in a first one or more symbol periods of the set of multiple symbol periods. The operations of 1410 may be performed in accordance with examples as disclosed herein. In some examples, aspects of the operations of 1410 may be performed by an SC signal communication manager 630 as described with reference to FIG. 6.

At 1415, the method may include transmitting the single carrier signals in a second one or more symbol periods of the set of multiple symbol periods, where the set of functions are to be performed on the transmitted single carrier signals based on the transmitted reference signal. The operations of 1415 may be performed in accordance with examples as disclosed herein. In some examples, aspects of the operations of 1415 may be performed by a multi-use RS manager 635 as described with reference to FIG. 6.

Figure 15:
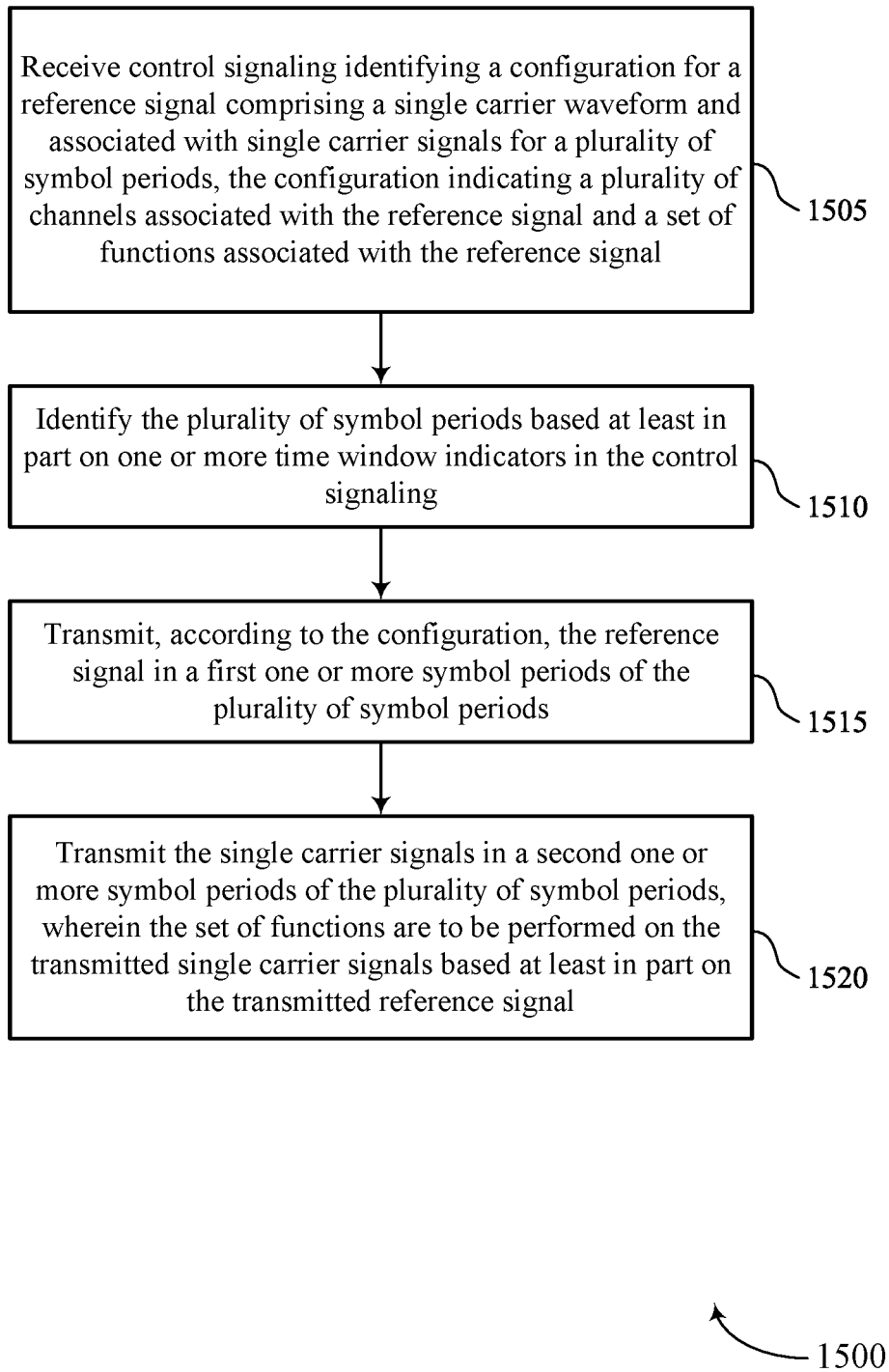

FIG. 15 shows a flowchart illustrating a method 1500 that supports multi-purpose shared time domain reference signal for higher bands in accordance with aspects of the present disclosure. The operations of the method 1500 may be implemented by a UE or its components as described herein. For example, the operations of the method 1500 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1505, the method may include receiving control signaling identifying a configuration for a reference signal including a single carrier waveform and associated with single carrier signals for a set of multiple symbol periods, the configuration indicating a set of multiple channels associated with the reference signal and a set of functions associated with the reference signal. The operations of 1505 may be performed in accordance with examples as disclosed herein. In some examples, aspects of the operations of 1505 may be performed by an RS configuration manager 625 as described with reference to FIG. 6.

At 1510, the method may include identifying the set of multiple symbol periods based on one or more time window indicators in the control signaling. The operations of 1510 may be performed in accordance with examples as disclosed herein. In some examples, aspects of the operations of 1510 may be performed by a multi-use RS symbol manager 645 as described with reference to FIG. 6.

At 1515, the method may include transmitting, according to the configuration, the reference signal in a first one or more symbol periods of the set of multiple symbol periods. The operations of 1515 may be performed in accordance with examples as disclosed herein. In some examples, aspects of the operations of 1515 may be performed by an SC signal communication manager 630 as described with reference to FIG. 6.

At 1520, the method may include transmitting the single carrier signals in a second one or more symbol periods of the set of multiple symbol periods, where the set of functions are to be performed on the transmitted single carrier signals based on the transmitted reference signal. The operations of 1520 may be performed in accordance with examples as disclosed herein. In some examples, aspects of the operations of 1520 may be performed by a multi-use RS manager 635 as described with reference to FIG. 6.

Figure 16:
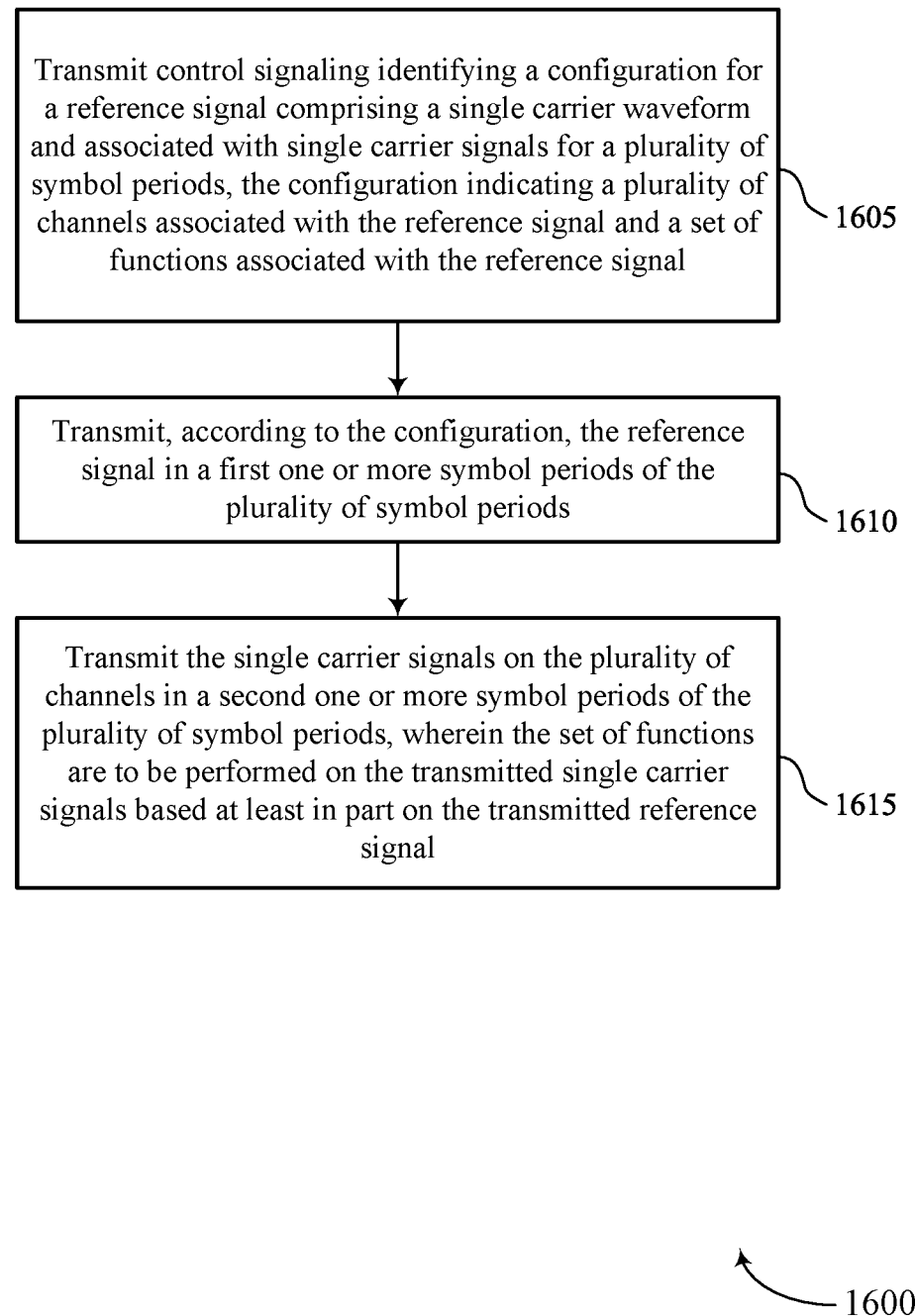

FIG. 16 shows a flowchart illustrating a method 1600 that supports multi-purpose shared time domain reference signal for higher bands in accordance with aspects of the present disclosure. The operations of the method 1600 may be implemented by a base station or its components as described herein. For example, the operations of the method 1600 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1605, the method may include transmitting control signaling identifying a configuration for a reference signal including a single carrier waveform and associated with single carrier signals for a set of multiple symbol periods, the configuration indicating a set of multiple channels associated with the reference signal and a set of functions associated with the reference signal. The operations of 1605 may be performed in accordance with examples as disclosed herein. In some examples, aspects of the operations of 1605 may be performed by an RS configuration manager 1025 as described with reference to FIG. 10.

At 1610, the method may include transmitting, according to the configuration, the reference signal in a first one or more symbol periods of the set of multiple symbol periods. The operations of 1610 may be performed in accordance with examples as disclosed herein. In some examples, aspects of the operations of 1610 may be performed by an SC signal communication manager 1030 as described with reference to FIG. 10.

At 1615, the method may include transmitting the single carrier signals on the set of multiple channels in a second one or more symbol periods of the set of multiple symbol periods, where the set of functions are to be performed on the transmitted single carrier signals based on the transmitted reference signal. The operations of 1615 may be performed in accordance with examples as disclosed herein. In some examples, aspects of the operations of 1615 may be performed by a multi-use RS manager 1035 as described with reference to FIG. 10.

Figure 17:
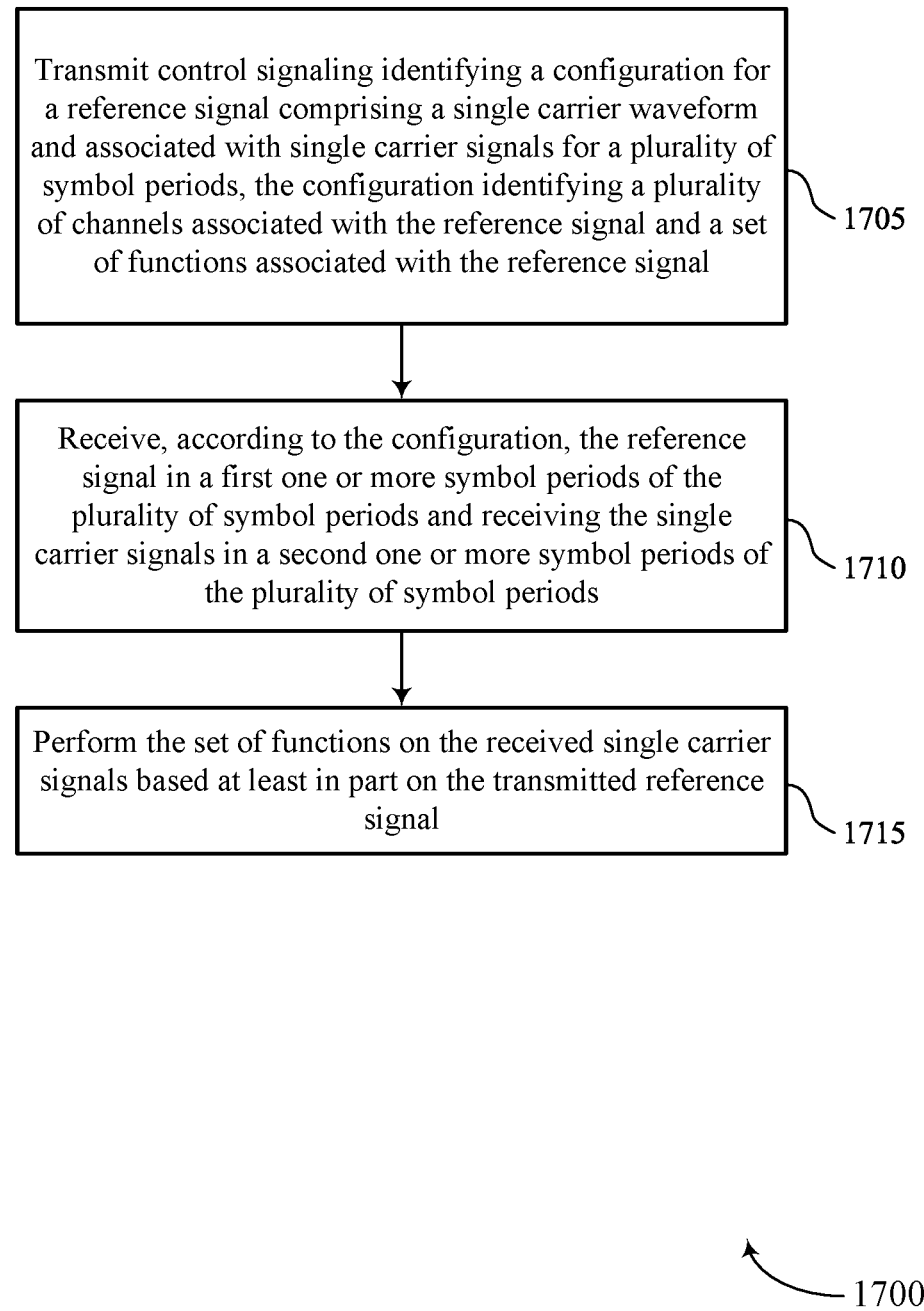

FIG. 17 shows a flowchart illustrating a method 1700 that supports multi-purpose shared time domain reference signal for higher bands in accordance with aspects of the present disclosure. The operations of the method 1700 may be implemented by a base station or its components as described herein. For example, the operations of the method 1700 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1705, the method may include transmitting control signaling identifying a configuration for a reference signal including a single carrier waveform and associated with single carrier signals for a set of multiple symbol periods, the configuration identifying a set of multiple channels associated with the reference signal and a set of functions associated with the reference signal. The operations of 1705 may be performed in accordance with examples as disclosed herein. In some examples, aspects of the operations of 1705 may be performed by an RS configuration manager 1025 as described with reference to FIG. 10.

At 1710, the method may include receiving, according to the configuration, the reference signal in a first one or more symbol periods of the set of multiple symbol periods and receiving the single carrier signals in a second one or more symbol periods of the set of multiple symbol periods. The operations of 1710 may be performed in accordance with examples as disclosed herein. In some examples, aspects of the operations of 1710 may be performed by an SC signal communication manager 1030 as described with reference to FIG. 10.

At 1715, the method may include performing the set of functions on the received single carrier signals based on the transmitted reference signal. The operations of 1715 may be performed in accordance with examples as disclosed herein. In some examples, aspects of the operations of 1715 may be performed by a multi-use RS manager 1035 as described with reference to FIG. 10.

The following provides an overview of aspects of the present disclosure:

Aspect 1: A method for wireless communication at a UE, comprising: receiving control signaling identifying a configuration for a reference signal comprising a single carrier waveform and associated with single carrier signals for a plurality of symbol periods, the configuration indicating a plurality of channels associated with the reference signal and a set of functions associated with the reference signal; receiving, according to the configuration, the reference signal in a first one or more symbol periods of the plurality of symbol periods and the single carrier signals on the plurality of channels in a second one or more symbol periods of the plurality of symbol periods; and performing the set of functions on the received single carrier signals based at least in part on the received reference signal.

Aspect 2: The method of aspect 1, further comprising: identifying the plurality of channels based at least in part on one or more channel indicators in the control signaling.

Aspect 3: The method of any of aspects 1 through 2, further comprising: identifying the plurality of symbol periods based at least in part on one or more time window indicators in the control signaling.

Aspect 4: The method of aspect 3, further comprising: identifying the plurality of channels based at least in part on the plurality of symbol periods.

Aspect 5: The method of any of aspects 3 through 4, further comprising: determining a set of channels that are within the plurality of symbol periods identified from the one or more time window indicators, wherein the plurality of channels indicated by the configuration comprise the determined set of channels.

Aspect 6: The method of any of aspects 1 through 5, further comprising: identifying one or more ports from a plurality of ports based at least in part on the configuration, the one or more ports for performing the set of functions on the received single carrier signals based at least in part on the received reference signal.

Aspect 7: The method of any of aspects 1 through 6, further comprising: transmitting a UE capability message to a base station identifying that the UE supports performing the set of functions based at least in part on the received reference signal comprising the single carrier waveform and associated with the single carrier signals for the plurality of symbol periods and the plurality of channels, wherein the configuration is based at least in part on the UE capability message.

Aspect 8: The method of any of aspects 1 through 7, further comprising: receiving the control signal identifying the configuration in a semi-static configuration signal, a dynamic configuration signal, or both.

Aspect 9: The method of any of aspects 1 through 8, further comprising: receiving the control signal identifying the configuration in a UE-specific configuration signal.

Aspect 10: The method of any of aspects 1 through 9, further comprising: receiving the control signal identifying the configuration in a multi-UE configuration signal.

Aspect 11: A method for wireless communication at a UE, comprising: receiving control signaling identifying a configuration for a reference signal comprising a single carrier waveform and associated with single carrier signals for a plurality of symbol periods, the configuration indicating a plurality of channels associated with the reference signal and a set of functions associated with the reference signal; transmitting, according to the configuration, the reference signal in a first one or more symbol periods of the plurality of symbol periods; and transmitting the single carrier signals in a second one or more symbol periods of the plurality of symbol periods, wherein the set of functions are to be performed on the transmitted single carrier signals based at least in part on the transmitted reference signal.

Aspect 12: The method of aspect 11, further comprising: identifying the plurality of channels based at least in part on one or more channel indicators in the control signaling.

Aspect 13: The method of any of aspects 11 through 12, further comprising: identifying the plurality of symbol periods based at least in part on one or more time window indicators in the control signaling.

Aspect 14: The method of aspect 13, further comprising: identifying the plurality of channels based at least in part on the plurality of symbol periods.

Aspect 15: The method of any of aspects 13 through 14, further comprising: determining a set of channels that are within the plurality of symbol periods identified from the one or more time window indicators, wherein the plurality of channels indicated by the configuration comprise the determined set of channels.

Aspect 16: The method of any of aspects 11 through 15, further comprising: identifying one or more ports from a plurality of ports based at least in part on the configuration, the one or more ports for performing the set of functions on the received single carrier signals based at least in part on the received reference signal.

Aspect 17: The method of any of aspects 11 through 16, further comprising: transmitting a UE capability message to a base station identifying that the UE supports performing the set of functions based at least in part on the received reference signal comprising the single carrier waveform and associated with the single carrier signals for the plurality of symbol periods and the plurality of channels, wherein the configuration is based at least in part on the UE capability message.

Aspect 18: The method of any of aspects 11 through 17, further comprising: receiving the control signal identifying the configuration in a semi-static configuration signal, a dynamic configuration signal, or both.

Aspect 19: The method of any of aspects 11 through 18, further comprising: receiving the control signal identifying the configuration in a UE-specific configuration signal.

Aspect 20: The method of any of aspects 11 through 19, further comprising: receiving the control signal identifying the configuration in a multi-UE configuration signal.

Aspect 21: A method for wireless communication at a base station, comprising: transmitting control signaling identifying a configuration for a reference signal comprising a single carrier waveform and associated with single carrier signals for a plurality of symbol periods, the configuration indicating a plurality of channels associated with the reference signal and a set of functions associated with the reference signal; transmitting, according to the configuration, the reference signal in a first one or more symbol periods of the plurality of symbol periods; and transmitting the single carrier signals on the plurality of channels in a second one or more symbol periods of the plurality of symbol periods, wherein the set of functions are to be performed on the transmitted single carrier signals based at least in part on the transmitted reference signal.

Aspect 22: The method of aspect 21, further comprising: receiving a UE capability message identifying that a UE supports performing the set of functions based at least in part on the transmitted reference signal comprising the single carrier waveform and associated with the single carrier signals for the plurality of symbol periods and the plurality of channels, wherein the configuration is based at least in part on the UE capability message.

Aspect 23: The method of any of aspects 21 through 22, further comprising: transmitting the control signal identifying the configuration in a semi-static configuration signal, a dynamic configuration signal, or both.

Aspect 24: The method of any of aspects 21 through 23, further comprising: transmitting the control signal identifying the configuration in a UE-specific configuration signal.

Aspect 25: The method of any of aspects 21 through 24, further comprising: transmitting the control signal identifying the configuration in a multi-UE configuration signal.

Aspect 26: A method for wireless communication at a base station, comprising: transmitting control signaling identifying a configuration for a reference signal comprising a single carrier waveform and associated with single carrier signals for a plurality of symbol periods, the configuration identifying a plurality of channels associated with the reference signal and a set of functions associated with the reference signal; receiving, according to the configuration, the reference signal in a first one or more symbol periods of the plurality of symbol periods and receiving the single carrier signals in a second one or more symbol periods of the plurality of symbol periods; and performing the set of functions on the received single carrier signals based at least in part on the transmitted reference signal.

Aspect 27: The method of aspect 26, further comprising: receiving a UE capability message identifying that a UE supports performing the set of functions based at least in part on the transmitted reference signal comprising the single carrier waveform and associated with the single carrier signals for the plurality of symbol periods and the plurality of channels, wherein the configuration is based at least in part on the UE capability message.

Aspect 28: The method of any of aspects 26 through 27, further comprising: transmitting the control signal identifying the configuration in a semi-static configuration signal, a dynamic configuration signal, or both.

Aspect 29: The method of any of aspects 26 through 28, further comprising: transmitting the control signal identifying the configuration in a UE-specific configuration signal.

Aspect 30: The method of any of aspects 26 through 29, further comprising: transmitting the control signal identifying the configuration in a multi-UE configuration signal.

Aspect 31: An apparatus for wireless communication at a UE, comprising a processor; memory coupled with the processor; and instructions stored in the memory and executable by the processor to cause the apparatus to perform a method of any of aspects 1 through 10.

Aspect 32: An apparatus for wireless communication at a UE, comprising at least one means for performing a method of any of aspects 1 through 10.

Aspect 33: A non-transitory computer-readable medium storing code for wireless communication at a UE, the code comprising instructions executable by a processor to perform a method of any of aspects 1 through 10.

Aspect 34: An apparatus for wireless communication at a UE, comprising a processor; memory coupled with the processor; and instructions stored in the memory and executable by the processor to cause the apparatus to perform a method of any of aspects 11 through 20.

Aspect 35: An apparatus for wireless communication at a UE, comprising at least one means for performing a method of any of aspects 11 through 20.

Aspect 36: A non-transitory computer-readable medium storing code for wireless communication at a UE, the code comprising instructions executable by a processor to perform a method of any of aspects 11 through 20.

Aspect 37: An apparatus for wireless communication at a base station, comprising a processor; memory coupled with the processor; and instructions stored in the memory and executable by the processor to cause the apparatus to perform a method of any of aspects 21 through 25.

Aspect 38: An apparatus for wireless communication at a base station, comprising at least one means for performing a method of any of aspects 21 through 25.

Aspect 39: A non-transitory computer-readable medium storing code for wireless communication at a base station, the code comprising instructions executable by a processor to perform a method of any of aspects 21 through 25.

Aspect 40: An apparatus for wireless communication at a base station, comprising a processor; memory coupled with the processor; and instructions stored in the memory and executable by the processor to cause the apparatus to perform a method of any of aspects 26 through 30.

Aspect 41: An apparatus for wireless communication at a base station, comprising at least one means for performing a method of any of aspects 26 through 30.

Aspect 42: A non-transitory computer-readable medium storing code for wireless communication at a base station, the code comprising instructions executable by a processor to perform a method of any of aspects 26 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   at least one processor;
   at least one memory coupled with the at least one processor; and
   instructions stored in the at least one memory and executable by the at least one processor to cause the apparatus to:
   transmit a UE capability message identifying that the UE supports performing a set of functions based at least in part on a reference signal comprising a single carrier waveform and associated with single carrier signals for a plurality of symbol periods and a plurality of channels;
   receive control signaling identifying a configuration for the reference signal, the configuration indicating the plurality of channels and the set of functions associated with the reference signal, the configuration based at least in part on the UE capability message;
   receive, according to the configuration, the reference signal in a first one or more symbol periods of the plurality of symbol periods and the single carrier signals on the plurality of channels in a second one or more symbol periods of the plurality of symbol periods; and
   perform the set of functions on the single carrier signals based at least in part on the reference signal.

2. The apparatus of claim 1, wherein the instructions are further executable by the at least one processor to cause the apparatus to:

identify the plurality of channels based at least in part on one or more channel indicators in the control signaling.

3. The apparatus of claim 1, wherein the instructions are further executable by the at least one processor to cause the apparatus to:
identify the plurality of symbol periods based at least in part on one or more time window indicators in the control signaling.

4. The apparatus of claim 3, wherein the instructions are further executable by the at least one processor to cause the apparatus to:
identify the plurality of channels based at least in part on the plurality of symbol periods.

5. The apparatus of claim 3, wherein the instructions are further executable by the at least one processor to cause the apparatus to:
determine a set of channels that are within the plurality of symbol periods identified from the one or more time window indicators, wherein the plurality of channels indicated by the configuration comprise the set of channels.

6. The apparatus of claim 1, wherein the instructions are further executable by the at least one processor to cause the apparatus to:
identify one or more ports from a plurality of ports based at least in part on the configuration, the one or more ports for performing the set of functions on the single carrier signals based at least in part on the reference signal.

7. The apparatus of claim 1, wherein the instructions are further executable by the at least one processor to cause the apparatus to:
receive the control signaling identifying the configuration in a semi-static configuration signal, a dynamic configuration signal, or both.

8. The apparatus of claim 1, wherein the instructions are further executable by the at least one processor to cause the apparatus to:
receive the control signaling identifying the configuration in a UE-specific configuration signal.

9. The apparatus of claim 1, wherein the instructions are further executable by the at least one processor to cause the apparatus to:
receive the control signaling identifying the configuration in a multi-UE configuration signal.

10. An apparatus for wireless communication at a user equipment (UE), comprising:
at least one processor;
at least one memory coupled with the at least one processor; and
instructions stored in the at least one memory and executable by the at least one processor to cause the apparatus to:
transmit a UE capability message identifying that the UE supports performing a set of functions based at least in part on a reference signal comprising a single carrier waveform and associated with single carrier signals for a plurality of symbol periods and a plurality of channels;
receive control signaling identifying a configuration for the reference signal, the configuration indicating the plurality of channels and the set of functions associated with the reference signal, the configuration based at least in part on the UE capability message;
transmit, according to the configuration, the reference signal in a first one or more symbol periods of the plurality of symbol periods; and
transmit the single carrier signals in a second one or more symbol periods of the plurality of symbol periods, wherein the set of functions are to be performed on the single carrier signals based at least in part on the reference signal.

11. The apparatus of claim 10, wherein the instructions are further executable by the at least one processor to cause the apparatus to:
identify the plurality of channels based at least in part on one or more channel indicators in the control signaling.

12. The apparatus of claim 10, wherein the instructions are further executable by the at least one processor to cause the apparatus to:
identify the plurality of symbol periods based at least in part on one or more time window indicators in the control signaling.

13. The apparatus of claim 12, wherein the instructions are further executable by the at least one processor to cause the apparatus to:
identify the plurality of channels based at least in part on the plurality of symbol periods.

14. The apparatus of claim 12, wherein the instructions are further executable by the at least one processor to cause the apparatus to:
determine a set of channels that are within the plurality of symbol periods identified from the one or more time window indicators, wherein the plurality of channels indicated by the configuration comprise the set of channels.

15. The apparatus of claim 10, wherein the instructions are further executable by the at least one processor to cause the apparatus to:
identify one or more ports from a plurality of ports based at least in part on the configuration, the one or more ports for performing the set of functions on the single carrier signals based at least in part on the reference signal.

16. The apparatus of claim 10, wherein the instructions are further executable by the at least one processor to cause the apparatus to:
receive the control signaling identifying the configuration in a semi-static configuration signal, a dynamic configuration signal, or both.

17. The apparatus of claim 10, wherein the instructions are further executable by the at least one processor to cause the apparatus to:
receive the control signaling identifying the configuration in a UE-specific configuration signal.

18. The apparatus of claim 10, wherein the instructions are further executable by the at least one processor to cause the apparatus to:
receive the control signaling identifying the configuration in a multi-UE configuration signal.

19. An apparatus for wireless communication at a network device, comprising:
at least one processor;
at least one memory coupled with the at least one processor; and
instructions stored in the at least one memory and executable by the at least one processor to cause the apparatus to:
receive a user equipment (UE) capability message identifying that a UE supports performing a set of functions based at least in part on a reference signal comprising a single carrier waveform and associated with single carrier signals for a plurality of symbol periods and a plurality of channels;

transmit control signaling identifying a configuration for the reference signal, the configuration indicating the plurality of channels and the set of functions associated with the reference signal, the configuration based at least in part on the UE capability message;

transmit, according to the configuration, the reference signal in a first one or more symbol periods of the plurality of symbol periods; and transmit the single carrier signals on the plurality of channels in a second one or more symbol periods of the plurality of symbol periods, wherein the set of functions are to be performed on the single carrier signals based at least in part on the reference signal.

20. The apparatus of claim 19, wherein the instructions are further executable by the at least one processor to cause the apparatus to:

transmit the control signaling identifying the configuration in a semi-static configuration signal, a dynamic configuration signal, or both.

21. The apparatus of claim 19, wherein the instructions are further executable by the at least one processor to cause the apparatus to:

transmit the control signaling identifying the configuration in a UE-specific configuration signal.

22. The apparatus of claim 19, wherein the instructions are further executable by the at least one processor to cause the apparatus to:

transmit the control signaling identifying the configuration in a multi-UE configuration signal.

23. An apparatus for wireless communication at a network device, comprising:

at least one processor;

at least one memory coupled with the at least one processor; and instructions stored in the at least one memory and executable by the at least one processor to cause the apparatus to:

receive a user equipment (UE) capability message identifying that a UE supports performing a set of functions based at least in part on a reference signal comprising a single carrier waveform and associated with single carrier signals for a plurality of symbol periods and a plurality of channels;

transmit control signaling identifying a configuration for the reference signal, the configuration identifying the plurality of channels and the set of functions associated with the reference signal, the configuration based at least in part on the UE capability message;

receive, according to the configuration, the reference signal in a first one or more symbol periods of the plurality of symbol periods and receive the single carrier signals in a second one or more symbol periods of the plurality of symbol periods; and perform the set of functions on the single carrier signals based at least in part on the reference signal.

24. The apparatus of claim 23, wherein the instructions are further executable by the at least one processor to cause the apparatus to:

transmit the control signaling identifying the configuration in a semi-static configuration signal, a dynamic configuration signal, or both.

25. The apparatus of claim 23, wherein the instructions are further executable by the at least one processor to cause the apparatus to:

transmit the control signaling identifying the configuration in a UE-specific configuration signal.

26. The apparatus of claim 23, wherein the instructions are further executable by the at least one processor to cause the apparatus to:

transmit the control signaling identifying the configuration in a multi-UE configuration signal.

* * * * *